United States Patent
Mizuno

(10) Patent No.: US 10,465,084 B2
(45) Date of Patent: Nov. 5, 2019

(54) INKJET INK SET FOR CORRUGATED CARDBOARD, AND IMAGE FORMING METHOD

(71) Applicant: FUJIFILM CORPORATION, Minato-ku, Tokyo (JP)

(72) Inventor: Tomohiro Mizuno, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 15/936,465

(22) Filed: Mar. 27, 2018

(65) Prior Publication Data

US 2018/0215939 A1 Aug. 2, 2018

Related U.S. Application Data

(63) Continuation of application No. PCT/JP2016/079697, filed on Oct. 5, 2016.

(30) Foreign Application Priority Data

Oct. 6, 2015 (JP) ................................ 2015-198522

(51) Int. Cl.
*B41J 2/01* (2006.01)
*B41J 2/21* (2006.01)
(Continued)

(52) U.S. Cl.
CPC .............. *C09D 11/40* (2013.01); *B41J 2/01* (2013.01); *B41J 2/21* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 6,513,923 B1* 2/2003 Evans .................. C09D 11/40
                                                  347/100
6,824,262 B2* 11/2004 Kubota ................ B41M 5/0023
                                                  347/100
(Continued)

FOREIGN PATENT DOCUMENTS

EP        2128207 A1    12/2009
JP      2003-328299 A   11/2003
(Continued)

OTHER PUBLICATIONS

Extended European Search Report dated Aug. 21, 2018, issued in corresponding EP Patent Application No. 16853661.3.
(Continued)

*Primary Examiner* — Manish S Shah
(74) *Attorney, Agent, or Firm* — Solaris Intellectual Property Group, PLLC

(57) ABSTRACT

Provided are an inkjet ink set for corrugated cardboard, the inkjet ink set including inks of five colors, including a cyan ink, a magenta ink, a yellow ink, a black ink, and an α ink, in which in a case where images having a halftone dot area ratio of 100% are formed on a corrugated cardboard base material using the five color inks each separately, the hue angle h, the chroma saturation C*, and the lightness L* of the formed images in the CIE 1976 L*a*b* color space satisfy the relations of the following Formula 1 to the following Formula 3; and an image forming method. In Formula 1, $h_M$, $h_\alpha$, and $h_Y$ represent the respective hue angles h of the inks. In Formula 2, $C^*_M$, $C^*_\alpha$, and $C^*_Y$ represent the respective chroma saturations C* of the inks. In Formula 3, $L^*_M$ and $L^*_\alpha$ represent the respective lightness L* of the inks.

$$h_M < h_\alpha < h_Y \quad \text{Formula 1}$$

$$C^*_M < C^*_\alpha < C^*_Y \quad \text{Formula 2}$$

$$L^*_M < L^*_\alpha \quad \text{Formula 3.}$$

11 Claims, 3 Drawing Sheets

(51) Int. Cl.
*B41J 11/00* (2006.01)
*C09D 11/40* (2014.01)
*C09D 11/322* (2014.01)
*C09D 11/54* (2014.01)

(52) U.S. Cl.
CPC ........... *B41J 11/007* (2013.01); *C09D 11/322* (2013.01); *C09D 11/54* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 7,188,943 B2* | 3/2007 | Gondek | C09D 11/40 347/100 |
| 2003/0097961 A1 | 5/2003 | Yatake et al. | |
| 2005/0039632 A1 | 2/2005 | Yamamoto et al. | |
| 2006/0119681 A1 | 6/2006 | Sugimoto et al. | |
| 2006/0181586 A1 | 8/2006 | Kamoto et al. | |
| 2006/0268084 A1 | 11/2006 | Nishizaki et al. | |
| 2007/0266887 A1 | 11/2007 | Koganehira et al. | |
| 2010/0093900 A1 | 4/2010 | Ohya et al. | |
| 2018/0016452 A1* | 1/2018 | Clauter | C09D 11/037 |

FOREIGN PATENT DOCUMENTS

| | | | | |
|---|---|---|---|---|
| JP | 2006-160924 A | 6/2006 | | |
| JP | 2006-328140 A | 12/2006 | | |
| JP | 2007-136734 A | 6/2007 | | |
| JP | 2010-195909 A | 9/2010 | | |
| JP | 5115695 B2 | 1/2013 | | |
| JP | 2013-203846 A | 10/2013 | | |
| JP | 2013203846 A | * | 10/2013 | ............... B41J 2/01 |
| WO | 2001/094482 A1 | 12/2001 | | |
| WO | 2004039899 A1 | 5/2004 | | |
| WO | 2007/116868 A1 | 10/2007 | | |
| WO | 2008105289 A1 | 9/2008 | | |
| WO | 2015/122073 A1 | 8/2015 | | |

OTHER PUBLICATIONS

Quan, Shuxue, "Evaluation and Optimal Design of Spectral Sensitivities for Digital Color Imaging", RIT Scholar Works, Rochester Institute of Technology, Rochester, NY, Apr. 2002.
International Search Report issued in International Application No. PCT/JP2016/079697 dated Nov. 8, 2016.
International Preliminary Report on Patentability issued in International Application No. PCT/JP2016/079697 dated Mar. 14, 2018.
English language translation of the following: Office action dated Apr. 16, 2019 from the JPO in a Japanese patent application No. 2017-544205 corresponding to the instant patent application.

* cited by examiner

INKJET INK SET FOR CORRUGATED CARDBOARD, AND IMAGE FORMING METHOD

CROSS-REFERENCE TO RELATED APPLICATION

This application is a continuation application of International Application No. PCT/JP2016/079697, filed Oct. 5, 2016, the disclosure of which is incorporated herein by reference in its entirety. Further, this application claims priority from Japanese Patent Application No. 2015-198522, filed Oct. 6, 2015, the disclosure of which is incorporated herein by reference in its entirety.

BACKGROUND OF THE INVENTION

1. Field of the Invention

The present invention relates to an inkjet ink set for corrugated cardboard, and an image forming method.

2. Description of the Related Art

Image forming methods based on inkjet methods are widely utilized in recent years, from the viewpoint that image formation at high speed is enabled, and high-definition images can be recorded on a wide variety of base materials.

In regard to image formation based on inkjet methods, four-color ink sets each composed of a yellow (Y) ink, a magenta (M) ink, a cyan (C) ink, and a black (K) ink have been hitherto used; however, in recent years, ink sets including inks of colors other than the above-mentioned four colors have been suggested.

In JP5115695B, as an ink set including colors other than the four colors of CMYK, for example, an ink set including a yellow ink having a hue angle ∠H° in the range of 80° to 110°, the hue angle being defined with regard to the CIELAB color space at least on a recording medium, a magenta ink having a hue angle ∠H° in the range of 330° to 360°, a cyan ink having a hue angle ∠H° in the range 230° to 260°, and a black ink, as well as ink (A) and ink (B), has been suggested.

The ink (A) in this ink set has a hue angle ∠H° in the range of 0° to 80°, and the ink (B) has a hue angle ∠H° in the range of 0° to 80°. The ink (A) has higher chroma saturation and lower lightness than a magenta ink, while the ink (B) has higher lightness than a magenta ink and has higher chroma saturation and lower lightness than a yellow ink.

Furthermore, in S. Quan, "Evaluation and optimal design of spectral sensitivities for digital color imaging", RIT Scholar Works (2002), a method of determining the spectral absorption waveform by evaluating particular parameters for the color of an ink has been suggested.

SUMMARY OF THE INVENTION

Formation of multi-color images on corrugated cardboard base materials has been hitherto carried out by so-called analog printing methods of utilizing flexographic plates.

In recent years, along with the improvements in inkjet methods, which are digital printing methods, adoption of inkjet methods to the formation of multi-color images on corrugated cardboard base materials has been attempted.

However, in the case of forming a multi-color image on a corrugated cardboard base material, color reproducibility for the 18 colors as defined by the Japanese Corrugated Fiberboard Industry Standards (JCS) is required. The 18 colors defined by the JCS are colors that are required to be reproduced upon printing on corrugated cardboard base materials, and specifically, the 18 colors are defined in JCS M 0001: 2000. Furthermore, the color reproducibility implies that the color reproduction performance for an image is evaluated through the color approximation performance concerning the 18 colors defined in JCS M 0001: 2000.

The specifications of JCS M 0001:2000 have been conventionally used in order to evaluate reproducibility of hues in analog printing; however, in the case of forming a multi-color image on a corrugated cardboard base material, color tone reproducibility is evaluated by the above-mentioned standards, similarly to the case of forming an image by an inkjet method or the like.

In regard to conventional analog printing, reproduction of the 18 colors defined in JCS M 0001:2000 has been achieved by using inks of the 18 colors.

The inventors of the present invention considered that in regard to an inkjet method, it is important to enhance color reproducibility of the above-mentioned 18 colors by means of a small number of inks.

It is because the inventors thought that in order to use 18 color inks in an inkjet method, for example, providing 18 inkjet heads for the 18 color inks is not practical in view of cost, and in a case in which inkjet heads are used by switching the 18 color inks as appropriate in order to reduce the number of inkjet heads, the on-demand printability on many kinds of articles in small quantities, which is a major advantage of digital printing, will be significantly impaired.

An object of the embodiments of the present invention is to provide an inkjet ink set for corrugated cardboard and an image forming method, by which excellent color reproducibility is imparted to an image formed on a corrugated cardboard base material by an inkjet method.

Specific means for solving the problems include the following embodiments.

<1> An inkjet ink set for corrugated cardboard, the inkjet ink set comprising inks of five colors with different color tones, including a cyan ink, a magenta ink, a yellow ink, a black ink, and an α ink, wherein in a case in which images having a halftone dot area ratio of 100% are formed on a corrugated cardboard base material using the five color inks each separately, the hue angle h, the chroma saturation C*, and the lightness L* of the formed images in the CIE 1976 L*a*b* color space satisfy the relations of the following Formula 1 to the following Formula 3:

$$h_M < h_\alpha < h_Y \quad \text{Formula 1}$$

$$C^*_M < C^*_\alpha < C^*_Y \quad \text{Formula 2}$$

$$L^*_M < L^*_\alpha \quad \text{Formula 3}$$

in Formula 1, $h_M$ represents the hue angle h of an image formed by the magenta ink; $h_\alpha$ represents the hue angle h of an image formed by the α ink; and by represents the hue angle h of an image formed by the yellow ink, in Formula 2, $C^*_M$ represents the chroma saturation C* of an image formed by the magenta ink; $C^*_\alpha$ represents the chroma saturation C* of an image formed by the α ink; and $C^*_Y$ represents the chroma saturation C* of an image formed by the yellow ink, and in Formula 3, $L^*_M$ represents the lightness $L^*$ of an image formed by the magenta ink; and $L^*_\alpha$ represents the lightness $L^*$ of an image formed by the $\alpha$ ink.

<2> The inkjet ink set for corrugated cardboard according to <1>, wherein the hue angles h of an image as described above satisfy the following Formula 4, $h_M$ in the Formula 4 is −45 degrees to 25 degrees, by in Formula 4 is 51 degrees to 135 degrees, and $h_C$ in the Formula 4 is 160 degrees to 270 degrees:

$$h_M < h_\alpha < h_Y < h_C \quad \text{Formula 4}$$

in Formula 4, $h_M$ represents the hue angle h of an image formed by the magenta ink; $h_\alpha$ represents the hue angle h of an image formed by the $\alpha$ ink; by represents the hue angle h of an image formed by the yellow ink; and $h_C$ represents the hue angle h of an image formed by the cyan ink.

<3> The inkjet ink set for corrugated cardboard according to <1> or <2>, wherein the $h_\alpha$ is 33 degrees to 62 degrees.

<4> The inkjet ink set for corrugated cardboard according to any one of <1> to <3>, wherein the $C^*_\alpha$ is 43 degrees to 53 degrees.

<5> The inkjet ink set for corrugated cardboard according to any one of <1> to <4>, wherein the $L^*_\alpha$ is more than 48 and 56 or less.

<6> The inkjet ink set for corrugated cardboard according to any one of <1> to <5>, wherein the h$\alpha$ is 47 degrees to 49 degrees.

<7> The inkjet ink set for corrugated cardboard according to any one of <1> to <6>, wherein the $C^*_\alpha$ is 48 to 50.

<8> The inkjet ink set for corrugated cardboard according to any one of <1> to <7>, wherein the $L^*_\alpha$ is 52 to 54.

<9> The inkjet ink set for corrugated cardboard according to any one of <1> to <8>, further comprising a treatment liquid containing an acidic compound.

<10> An image forming method, comprising a step of applying inks onto a corrugated cardboard base material by an inkjet method using the inkjet ink set for corrugated cardboard according to any one of <1> to <9>.

<11> The image forming method according to <10>, wherein the amount of jetting of the ink per unit area by an inkjet method in the step of applying inks is 8680 pl/mm$^2$ or less.

<12> The image forming method according to <10> or <11>, wherein in the CIE 1976 $L^*a^*b^*$ color space of the surface of the corrugated cardboard base material where the inks are applied, $L^*$ is 52 to 72, $a^*$ is 4 to 14, and $b^*$ is 23 to 33.

According to an embodiment of the invention, there are provided an inkjet ink set for corrugated cardboard and an image forming method, by which excellent color reproducibility is imparted to an image formed on a corrugated cardboard base material by an inkjet method.

DESCRIPTION OF THE PREFERRED EMBODIMENTS

<Inkjet Ink Set for Corrugated Cardboard>

Figure 1:
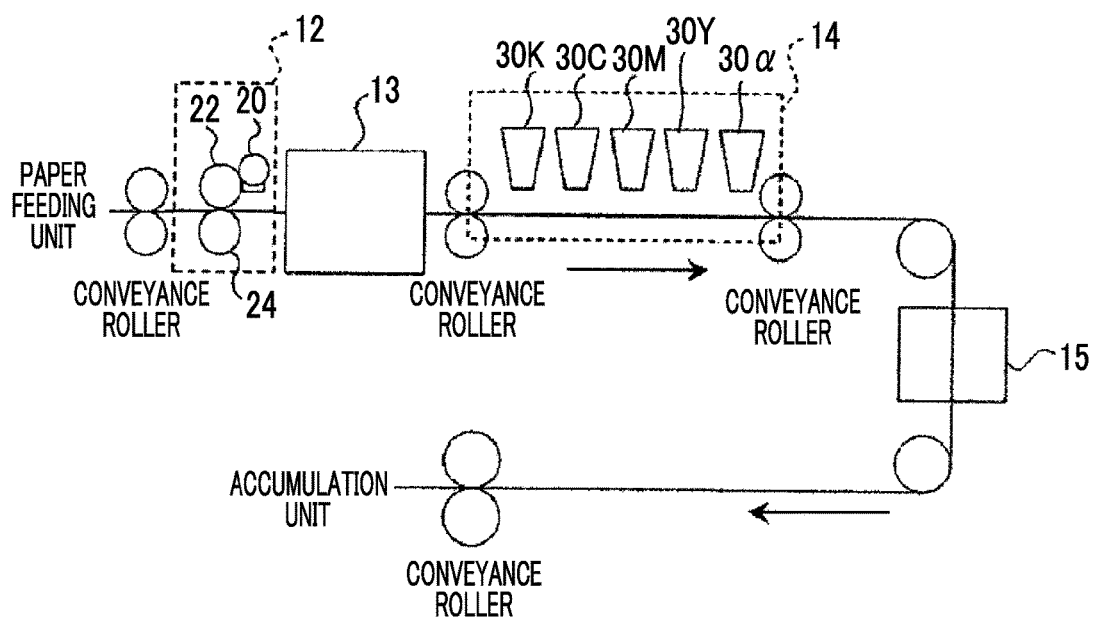
FIG. 1 is a schematic configuration diagram illustrating an example of an inkjet image forming apparatus used for carrying out image formation.

The inkjet ink set for corrugated cardboard of the present disclosure (hereinafter, also simply referred to as "ink set") comprises inks of five colors with different color tones, including a cyan ink, a magenta ink, a yellow ink, a black ink, and an $\alpha$ ink, and in a case in which images having a halftone dot area ratio of 100% are formed on a corrugated cardboard base material using the five color inks each separately, the hue angle h, the chroma saturation $C^*$, and the lightness $L^*$ of the formed images in the CIE 1976 $L^*a^*b^*$ color space satisfy the relations of the following Formula 1 to the following Formula 3:

$$h_M < h_\alpha < h_Y \quad \text{Formula 1}$$

$$C^*_M < C^*_\alpha < C^*_Y \quad \text{Formula 2}$$

$$L^*_M < L^*_\alpha \quad \text{Formula 3}$$

In Formula 1, $h_M$ represents the hue angle h of the magenta ink; $h_\alpha$ represents the hue angle h of the $\alpha$ ink; and $h_Y$ represents the hue angle of the yellow ink.

In Formula 2, $C^*_M$ represents the chroma saturation $C^*$ of the magenta ink; $C^*_\alpha$ represents the chroma saturation $C^*$ of the $\alpha$ ink; and $C^*_Y$ represents the chroma saturation $C^*$ of the yellow ink.

In Formula 3, $L^*_M$ represents the lightness $L^*$ of the magenta ink; and $L^*_\alpha$ represents the lightness $L^*$ of the $\alpha$ ink.

It is preferable that the ink set according to the present disclosure includes the five color inks described above and a treatment liquid containing an acidic compound.

The ink set according to the present disclosure may include an ink of a color other than the above-described five color inks (for example, a clear ink).

The ink set of the present disclosure may be a so-called two-liquid type ink set, by which an image is formed by bringing the inks of various colors into contact with an acidic compound included in a treatment liquid, or may be a so-called one-liquid type ink set, by which an image is formed only with the inks of various colors, without using a treatment liquid.

In the case of using the ink set of the present embodiment, the reason why the color reproducibility is excellent is not clearly understood; however, the reason is speculated to be as follows.

Ink sets further including an ink of another color in addition to the four color inks, such as a cyan (C) ink, a magenta (M) ink, a yellow (Y) ink, and a black (K) ink, have been hitherto suggested. For example, the ink set described in JP5115695B includes inks (A) and (B) in addition to the four color inks of CMYK. These inks (A) and (B) have a hue angle h in the range of 0 degrees to 80 degrees, the ink (A) has higher chroma saturation and lower lightness than the magenta ink, while the ink (B) has higher lightness than the magenta ink and has higher chroma saturation and lower lightness than the yellow ink. In regard to the ink set described in JP5115695B, image formation on a corrugated cardboard base material was not assumed, and no investigation was conducted on color reproducibility.

In a case in which an image is formed on a corrugated cardboard base material using the ink set including ink (A) and ink (B) as described in JP5115695B, it is expected that the color reproducibility of the 18 colors defined in JCS M 0001:2000 is low in view of the relations between the chroma saturation $C^*$ and the lightness $L^*$ of the inks (A) and (B) and the magenta ink as well as the yellow ink.

The ink set of the present disclosure is produced to include five color inks, including a cyan ink, a magenta ink, a yellow ink, a black ink, and an α ink, such that the hue angle h, chroma saturation C*, and lightness L* of the various inks satisfy the relations described above.

That is, it is considered that an image exhibiting excellent color reproducibility of the 18 colors defined in JCS M 0001:2000 can be formed by an inkjet method, by selecting, as the α ink, an ink which has a hue angle h that is larger than that of the magenta ink and is smaller than that of the yellow ink, has a chroma saturation C* that is higher than that of the magenta ink and is lower than that of the yellow ink, and has a lightness L* that is higher than that of the magenta ink.

Particularly, by using the α ink described above, an image exhibiting excellent color reproducibility of six colors, including "D-010 Peony", "D-030 Red", "D-040 Red", "D-050 Orange", "D-060 Orange", and "D-070 Yellow" (hereinafter, also referred to as particular six colors), among the 18 colors defined in JCS M 0001:2000, can be formed.

In the following description, the ink set of the present disclosure will be explained in detail.

In the present specification, the symbol "~" representing a numerical value range indicates a range including the values of the upper limit and the lower limit.

In the present specification, the values of "L*", "a*", and "b*" are values in the CIE 1976 L*a*b* color space, which are obtainable in a case in which images having a halftone dot area ratio of 100% are formed using inks of various colors, each image being formed using a single color. Furthermore, the conditions for the measurement of L*a*b* include illuminant A and a viewing field of 2 degrees, and FD-7 manufactured by Konica Minolta, Inc. is used as the analyzer.

The halftone dot area ratio means the proportion of an area occupied by halftone dots per unit area, as expressed in percentage.

Furthermore, in the present specification, the "hue angle h" means a correlation quantity calculated according to JIS Z 8781-4:2013. The above-mentioned a* and b* are used for the calculation of the hue angle h.

The "chroma saturation C*" means a correlation quantity calculated according to JIS Z 8781-4:2013. The above-mentioned a* and b* are used for the calculation of the chroma saturation C.

The "lightness L*" means a correlation quantity calculated according to JIS Z 8781-4: 2013. The lightness L* is a value measured as described above.

[Five Color Inks]

The ink set according to the present disclosure includes at least five color inks with different color tones, namely, a cyan ink, a magenta ink, a yellow ink, a black ink, and an α ink.

The five color inks described above are such that in a case in which images having a halftone dot area ratio of 100% are formed on a corrugated cardboard base material using the five color inks each separately, the hue angle h, the chroma saturation C*, and the lightness L* of the formed images in the CIE 1976 L*a*b* color space satisfy the relations of the following Formula 1 to the following Formula 3.

In the CIE 1976 L*a*b* color space of the corrugated cardboard base material, L* is 60, a* is 11, and b* is 26.

As the hue angle h, chroma saturation C*, and lightness L* of the images satisfy the above-described relations, images exhibiting excellent color reproducibility of the 18 colors defined in JCS M 0001:2000 can be formed on a corrugated cardboard base material.

Hereinafter, for convenience, the hue angle h of an image formed by the α ink (10 and the like will also be referred to as hue angle h of the α ink (10 and the like. For example, in a case in which the phrase "chroma saturation C* of the magenta ink ($C^*_M$)" is described, this means the chroma saturation C* of an image formed by the magenta ink ($C^*_M$), which has been formed and measured by the method described above.

The relations of the hue angle h, chroma saturation C*, and lightness L* of images can be found, for example, as follows. Here, an explanation will be given by using an example of the case in which the values of the hue angle h, chroma saturation C*, and lightness L* of the cyan ink, magenta ink, yellow ink, and black ink are assumed to be constant values.

It is preferable that the hue angles h of images satisfy the following Formula 4, and $h_M$ is −45 degrees to 25 degrees, by is 51 degrees to 135 degrees, while $h_C$ is 160 degrees to 270 degrees.

$$h_M < h_\alpha < h_Y < h_C \qquad \text{Formula 4}$$

In Formula 4, $h_M$ represents the hue angle h of the magenta ink, $h_\alpha$ represents the hue angle h of the α α ink, $h_Y$ represents the hue angle h of the yellow ink, and $h_C$ represents the hue angle h of the cyan ink.

~Color Reproducibility of 18 Colors~

First, inks having different values of the hue angle h, chroma saturation C*, and lightness L* (for example, inks under the conditions 1330) are assumed, and the color reproduction ranges are calculated. The average color differences are determined by comparing the color reproduction ranges for the various inks and the color tones of the 18 colors defined in JCS M 0001:2000. At this time, it is also acceptable that the hue angle h, chroma saturation C*, and lightness L* are each divided into, for example, three regions, the respective regions are combined to form "groups", and a comparison is made between the minimum values of the average color differences between those groups.

Next, the inks are ranked, from the ink that gives a smaller average color difference of images formed by the various inks as determined as described above. An ink of higher rank can form images with smaller average color differences, that is, images exhibiting excellent color reproducibility of the 18 colors defined in JCS M 0001:2000.

Among the inks that have been ranked as described above, for example, the hue angle h, chroma saturation C*, and lightness L* of an image formed by the ink of the 34$^{th}$ rank from the top in an increasing order of color tone, are compared with the values of the hue angle h, chroma saturation C*, and lightness L* of the cyan ink, magenta ink, yellow ink, and black ink, and the relations between the hue angle h, chroma saturation C*, and lightness L* of the five color inks are determined.

(α Ink)

The α ink is such that the hue angle h of the α ink ($h_\alpha$) is larger than the hue angle h of the magenta ink and smaller than the hue angle h of the yellow ink, the chroma saturation C* of the α ink ($C^*_\alpha$) is higher than the chroma saturation C* of the magenta ink and lower than the chroma saturation C* of the yellow ink, and the lightness L* of the α ink ($L^*_\alpha$) is higher than the lightness L* of the magenta ink.

In a case in which $h_\alpha$ of the α ink is larger than that of the magenta ink and smaller than that of the yellow ink, an ink set exhibiting excellent color reproducibility of the particular six colors is obtained. Furthermore, in a case in which the chroma saturation C* ($C^*_\alpha$) is higher than that of the magenta ink and lower than that of the yellow ink, and the lightness L* ($L^*_\alpha$) is higher than that of the magenta ink, an ink set exhibiting excellent color reproducibility is obtained.

In addition to the factors described above, in a case in which the chroma saturation C* of the α ink ($C^*_\alpha$) is higher than that of the magenta ink and lower than that of the yellow ink, and the lightness L* ($L^*_\alpha$) is higher than that of the magenta ink, color reproducibility can be increased with small droplet amounts, and therefore, it is advantageous for reducing mottling.

The term "mottling" refers to a phenomenon in which regions having a high density are partially generated in an image formed, and density unevenness occurs.

From the viewpoint of color reproducibility, the $h_\alpha$ of the α ink is preferably 33 degrees to 62 degrees, and more preferably 47 degrees to 49 degrees.

From the viewpoint of color reproducibility, the $C^*_\alpha$ of the α ink is preferably 43 to 53, and more preferably 48 to 50.

From the viewpoint of color reproducibility, the $L^*_\alpha$ of the α ink is preferably more than 48 and 56 or less, and more preferably 52 to 54.

The hue angle h, chroma saturation C*, and lightness L* of the α ink can be adjusted by the components (particularly, coloring materials) included in the α ink. Specifically, for example, the properties can be adjusted by mixing two or more kinds of coloring materials. The details of the coloring materials included in the α ink will be described in the explanation for the ink components that will be given below.

(Magenta Ink)

The magenta ink is such that the hue angle h of the magenta ink ($h_M$) is smaller than the hue angle h of the α ink, the chroma saturation C* of the magenta ink ($C^*_M$) is lower than the chroma saturation C* of the α ink, and the lightness L* of the magenta ink ($L^*_M$) is lower than the lightness L* of the α ink ($L^*_\alpha$).

The $h_M$ of the magenta ink is preferably −45 degrees to 25 degrees, and more preferably 0 degrees to 25 degrees.

The $C^*_M$ of the magenta ink is preferably 20 to 40, and more preferably 30 to 40.

The $L^*_M$ of the magenta ink is preferably 30 to 50, and more preferably 40 to 50.

The hue angle h, chroma saturation C*, and lightness L* of the magenta ink can be adjusted by means of the components (particularly, coloring materials) included in the magenta ink. The details of the coloring materials included in the magenta ink will be described in the explanation of the ink components that will be given below.

(Yellow Ink)

The yellow ink is such that the hue angle h ($h_Y$) is larger than the hue angle h of the α ink, and the chroma saturation C* ($C^*_Y$) is higher than the chroma saturation C* of the α ink.

The $h_Y$ of the yellow ink is preferably 51 degrees to 135 degrees, and more preferably 51 degrees to 90 degrees.

The $C^*_Y$ of the yellow ink is preferably 45 to 60, and more preferably 50 to 60.

The lightness L* of the yellow ink ($L^*_Y$) is preferably 50 to 70, and more preferably 55 to 65.

The hue angle h, chroma saturation C*, and lightness L* of the yellow ink can be adjusted by means of the components (particularly, coloring materials) included in the yellow ink. The details of the coloring materials included in the yellow ink will be described in the explanation of the ink components that will be given below.

(Cyan Ink)

The hue angle h of the cyan ink ($h_C$) is smaller than the hue angle h of the magenta ink.

The hue angle h of the cyan ink ($h_C$) is preferably 160 degrees to 270 degrees, and more preferably 160 degrees to 225 degrees.

The chroma saturation C* of the cyan ink ($C^*_C$) is preferably 10 to 40, and more preferably 25 to 40.

The lightness L* of the cyan ink ($L^*_C$) is preferably 30 to 50, and more preferably 40 to 50.

The hue angle h, chroma saturation C*, and lightness L* of the cyan ink can be adjusted by means of the components (particularly, coloring materials) included in the cyan ink. The details of the coloring materials included in the cyan ink will be described in the explanation of the ink components that will be given below.

(Black Ink)

The chroma saturation C* of the black ink (C*B) is preferably 10 or less, more preferably 0 to 5, and even more preferably 2 to 3.

The lightness L* of the black ink ($L^*_B$) is preferably 40 or less, more preferably 20 to 30, and even more preferably 20 to 25.

The chroma saturation C* and the lightness L* of the black ink can be adjusted by means of the components (particularly, coloring materials) included in the black ink. The details of the coloring materials included in the black ink will be described in the explanation of the ink components that will be given below.

(Components Included in Five Color Inks)

The five color inks include at least coloring materials. The components other than the coloring materials included in the five color inks are not particularly limited as long as the hue angle h, chroma saturation C*, and lightness L* of the ink of each color in the above-mentioned five color inks satisfy the relations described above.

Examples of the components included in the five color inks include water, a water-soluble solvent, a surfactant, urea, colloidal silica, a water-soluble polymeric compound, an antifoaming agent, an inorganic salt, resin particles, and wax particles.

It is preferable that the five color inks include components that aggregate when brought into contact with the treatment liquid that will be described below (hereinafter, also referred to as aggregating components; for example, resin particles).

—Coloring Materials—

The five color inks contain at least one coloring material. Regarding the coloring material, a pigment may be used, or an acidic dye may be used. Regarding the coloring material, it is preferable to use a pigment, and in the case of using a pigment, a resin-coated pigment having a structure in which at least a portion of the surface of a pigment is coated with a resin (hereinafter, also referred to as "coating resin") is preferred. Thereby, the dispersion stability of the ink is enhanced, and the quality of the image thus formed is enhanced.

—Pigment—

The pigment is not particularly limited and can be selected as appropriate according to the purpose. For example, the pigment may be any of an organic pigment and an inorganic pigment. It is preferable that the pigment is a pigment that is almost insoluble or sparingly soluble in water, from the viewpoint of colorability of the ink.

Examples of the organic pigment include an azo pigment, a polycyclic pigment, a dye chelate, a nitro pigment, a nitroso pigment, and aniline black. Among them, an azo pigment, a polycyclic pigment, and the like are more preferred.

Examples of the inorganic pigment include titanium oxide, iron oxide, calcium carbonate, barium sulfate, aluminum hydroxide, Barium Yellow, Cadmium Red, Chrome Yellow, and Carbon Black.

Examples of the pigment that is included in the α ink include yellow pigments, including monoazo pigments such as C.I. Pigment Yellow 1, 2, 3, 4, 5, 10, 65, 73, 74, 75, 97, 98, 111, 116, 130, 167, and 205; monoazo lake pigments such as C.I. Pigment Yellow 61, 62, 100, 168, 169, 183, 191, 206, 209, and 212; disazo pigments such as C.I. Pigment Yellow 12, 13, 14, 16, 17, 55, 63, 77, 81, 83, 106, 124, 126, 127, 152, 155, 170, 172, 174, 176, 214, and 219; anthraquinone pigments such as C.I. Pigment Yellow 24, 99, 108, 193, and 199; monoazo pyrazolone pigments such as C.I. Pigment Yellow 60; condensed azo pigments such as C.I. Pigment Yellow 93, 95, 128, and 166; isoindoline pigments such as C.I. Pigment Yellow 109, 110, 139, 173, and 185; benzimidazolone pigments such as C.I. Pigment Yellow 120, 151, 154, 175, 180, 181, and 194; azomethine metal complex pigments such as C.I. Pigment Yellow 117, 129, 150, and 153; quinophthalone pigment such as C.I. Pigment Yellow 138; and quinoxaline pigments such as C.I. Pigment Yellow 213;

red or magenta pigments, including monoazo lake pigments such as C.I. Pigment Red 193; disazo pigments such as C.I. Pigment Red 38; naphthol AS pigments such as C.I. Pigment Red 2, 5, 8, 9, 10, 11, 12, 14, 15, 16, 17, 18, 22, 23, 31, 32, 112, 114, 146, 147, 150, 170, 184, 187, 188, 210, 213, 238, 245, 253, 256, 258, 266, 268, and 269; β-naphthol pigments such as C.I. Pigment Red 3, 4, and 6; β-naphthol lake pigments such as C.I. Pigment Red 49, 53, and 68; naphthol AS lake pigments such as 237, 239, and 247; pyrazolone pigments such as C.I. Pigment Red 41; BONA lake pigments such as C.I. Pigment Red 48, 52, 57, 58, 63, 64:1, and 200; xanthene lake pigments such as C.I. Pigment Red 81:1, 169, and 172; thioindigo pigments such as C.I. Pigment Red 88, 181, and 279; perylene pigments such as C.I. Pigment Red 123, 149, 178, 179, 190, and 224; condensed azo pigments such as C.I. Pigment Red 144, 166, 214, 220, 221, 242, and 262; anthraquinone pigments such as C.I. Pigment Red 168, 177, 182, 226, and 263; anthraquinone lake pigments such as C.I. Pigment Red 83; benzimidazolone pigments such as C.I. Pigment Red 171, 175, 176, 185, and 208; quinacridone pigments such as C.I. Pigment Red 122, 202 (including a mixture with C.I. Pigment Violet 19), 207, and 209; diketopyrrolopyrrole pigment such as C.I. Pigment Red 254, 255, 264, 270, and 272; and azomethine metal complex pigment such as C.I. Pigment Red 257 and 271;

orange-colored pigments, including monoazo pigments such as C.I. Pigment Orange 1; β-naphthol pigments such as C.I. Pigment Orange 2, 3, and 5; naphthol AS pigments such as C.I. Pigment Orange 4, 24, 38, and 74; pyrazolone pigments such as C.I. Pigment Orange 13 and 34; benzimidazolone pigments such as C.I. Pigment Orange 36, 60, 62, 64, and 72; disazo pigments such as C.I. Pigment Orange 15 and 16; β-naphthol lake pigments such as C.I. Pigment Orange 17 and 46; naphthalenesulfonic acid lake pigment such as C.I. Pigment Orange 19; perinone pigments such as C.I. Pigment Orange 43; quinacridone pigments such as C.I. Pigment Orange 48 and 49; anthraquinone-based pigments such as C.I. Pigment Orange 51; isoindolinone pigment such as C.I. Pigment Orange 61; isoindoline-based pigments such as C.I. Pigment Orange 66; azomethine metal complex pigment such as C.I. Pigment Orange 68; and diketopyrrolopyrrole pigments such as C.I. Pigment Orange 71, 73, and 81; and brown pigments, including BONA lake pigments such as C.I. Pigment Brown 5; condensed azo pigments such as C.I. Pigment Brown 23, 41, and 42; and benzimidazolone pigments such as C.I. Pigment Brown 25 and 32.

These pigments may be used singly, or two or more kinds thereof may be used in combination.

Examples of the pigment that is included in the magenta ink include red or magenta pigments, including monoazo lake pigments such as C.I. Pigment Red 193; disazo pigments such as C.I. Pigment Red 38; naphthol AS pigments such as C.I. Pigment Red 2, 5, 8, 9, 10, 11, 12, 14, 15, 16, 17, 18, 22, 23, 31, 32, 112, 114, 146, 147, 150, 170, 184, 187, 188, 210, 213, 238, 245, 253, 256, 258, 266, 268, and 269; β-naphthol pigments such as C.I. Pigment Red 3, 4, and 6; β-naphthol lake pigments such as C.I. Pigment Red 49, 53, and 68; naphthol AS lake pigments such as C.I. Pigment Red 237, 239, and 247; pyrazolone pigments such as C.I. Pigment Red 41; BONA lake pigments such as C.I. Pigment Red 48, 52, 57, 58, 63, 64:1, and 200; xanthene lake pigments such as C.I. Pigment Red 81:1, 169, and 172; thioindigo pigments such as C.I. Pigment Red 88, 181, and 279; perylene pigments such as C.I. Pigment Red 123, 149, 178, 179, 190, and 224; condensed azo pigments such as C.I. Pigment Red 144, 166, 214, 220, 221, 242, and 262; anthraquinone pigments such as C.I. Pigment Red 168, 177, 182, 226, and 263; anthraquinone lake pigments such as C.I. Pigment Red 83; benzimidazolone pigments such as C.I. Pigment Red 171, 175, 176, 185, and 208; quinacridone pigments such as C.I. Pigment Red 122, 202 (including a mixture with C.I. Pigment Violet 19), 207, and 209; diketopyrrolopyrrole pigments such as C.I. Pigment Red 254, 255, 264, 270, and 272; and azomethine metal complex pigments such as C.I. Pigment Red 257 and 271.

These pigments may be used singly, or two or more kinds thereof may be used in combination.

Examples of the pigment that is included in the yellow ink include yellow pigments, including monoazo pigments such as C.I. Pigment Yellow 1, 2, 3, 4, 5, 10, 65, 73, 74, 75, 97, 98, 111, 116, 130, 167, and 205; monoazo lake pigments such as C.I. Pigment Yellow 61, 62, 100, 168, 169, 183, 191, 206, 209, and 212; disazo pigments such as C.I. Pigment Yellow 12, 13, 14, 16, 17, 55, 63, 77, 81, 83, 106, 124, 126, 127, 152, 155, 170, 172, 174, 176, 214, and 219; anthraquinone pigments such as C.I. Pigment Yellow 24, 99, 108, 193, and 199; monoazo pyrazolone pigments such as C.I. Pigment Yellow 60; condensed azo pigments such as C.I. Pigment Yellow 93, 95, 128, and 166; isoindoline pigments such as C.I. Pigment Yellow 109, 110, 139, 173, and 185; benzimidazolone pigments such as C.I. Pigment Yellow 120, 151, 154, 175, 180, 181, and 194; azomethine metal complex pigments such as C.I. Pigment Yellow 117, 129, 150, and 153; quinophthalone pigments such as C.I. Pigment Yellow 138; and quinoxaline pigments such as C.I. Pigment Yellow 213.

These pigments may be used singly, or two or more kinds thereof may be used in combination.

Examples of the pigment that is included in the cyan ink include blue or cyan pigments, including naphthol AS pigments such as C.I. Pigment Blue 25 and 26; phthalocyanine pigments such as C.I. Pigment Blue 15, 15:1, 15:2, 15:3, 15:4, 15:6, 16, 17:1, 75, and 79; dyeing lake pigments such as C.I. Pigment Blue 1, 24:1, 56, 61, and 62; anthraquinone-based pigments such as C.I. Pigment Blue 60; indigo pigments such as C.I. Pigment Blue 63; and dioxazine pigments such as C.I. Pigment Blue 80; and green pigments such as dyeing lake pigments such as C.I. Pigment Green 1 and 4; phthalocyanine pigments such as C.I. Pigment Green 7 and 36; and azomethine metal complex pigments such as C.I. Pigment Green 8.

Examples of the pigment that is included in the black ink include black pigments such as indazine pigments such as C.I. Pigment Black 1; carbon black that is C.I. Pigment Black 7; graphite that is C.I. Pigment Black 10; magnetite that is C.I. Pigment Black 11; anthraquinone pigments such as C.I. Pigment Black 20; and perylene pigments such as C.I. Pigment Black 31 and 32.

It is desirable that the volume average particle size of the pigment is smaller from the viewpoint of color reproducibility; however, from the viewpoint of light resistance, it is preferable that the volume average particle size is larger. From the viewpoint of achieving a balance between these, the volume average particle size is preferably 10 nm to 200 nm, more preferably 10 nm to 150 nm, and even more preferably 10 nm to 120 nm. In regard to the particle size distribution of the pigment, there are no particular limitations, and any of a pigment having a large particle size distribution and a pigment having a monodisperse particle size distribution may be used. It is also acceptable to use a mixture of two or more kinds of pigments each having a monodisperse particle size distribution.

The volume average particle size refers to a value measured using a particle size distribution analyzer using light scattering (for example, MICROTRAC UPA (registered trademark) EX150 manufactured by Nikkiso Co., Ltd.).

From the viewpoint of the image density, the content of the pigment in the ink is preferably 1% by mass to 20% by mass, and more preferably 2% by mass to 10% by mass, with respect to the total mass of the ink.

—Coating Resin—

Regarding the coating resin for the resin-coated pigment, a dispersant is preferred.

The dispersant may be any of a polymeric dispersant and a low-molecular weight surfactant type dispersant.

The polymeric dispersant may be any of a water-soluble dispersant and a water-insoluble dispersant.

Regarding the low-molecular weight surfactant type dispersant, for example, the known low-molecular weight surfactant type dispersants described in paragraphs 0047 to 0052 of JP2011-178029A can be used.

Among the polymeric dispersants, examples of the water-soluble dispersant include hydrophilic polymeric compounds. Examples of naturally occurring hydrophilic polymeric compounds include plant-based polymers such as gum arabic, tragacanth gum, guar gum, gum karaya, locust bean gum, arabinogalactan, pectin, and quince seed starch; algae-based polymers such as alginic acid, carrageenan, and agar; animal-based polymers such as gelatin, casein, albumin, and collagen; and microbial polymers such as xanthene gum and dextran.

Examples of a hydrophilic polymeric compound obtained by modifying a naturally occurring material with a raw material include cellulosic polymers such as methyl cellulose, ethyl cellulose, hydroxyethyl cellulose, hydroxypropyl cellulose, and carboxymethyl cellulose; starch-based polymers such as sodium starch glycolate and sodium starch phosphoric acid ester; and algae-based polymers such as sodium alginate and alginic acid propylene glycol ester.

Furthermore, examples of a synthesized hydrophilic polymeric compound include vinyl-based polymers such as polyvinyl alcohol, polyvinyl pyrrolidone, and polyvinyl methyl ether; acrylic resins such as a non-crosslinked polyacrylamide, polyacrylic acid or an alkali metal salt thereof; and a water-soluble styrene-acrylic resin; a water-soluble styrene-maleic acid resin, a water-soluble vinylnaphthalene-acrylic resin, a water-soluble vinylnaphthalene-maleic acid resin, polyvinylpyrrolidone, polyvinyl alcohol, an alkali metal salt of β-naphthalenesulfonic acid-formalin condensate, a polymeric compound having a salt of a cationic functional group such as a quaternary ammonium or an amino group in a side chain, and a naturally occurring polymeric compound such as shellac.

Among these, a water-soluble dispersant having carboxyl groups introduced therein, such as a homopolymer of acrylic acid, methacrylic acid, or styrene-acrylic acid; or a copolymer of thereof with a monomer having another hydrophilic group, is preferred as the hydrophilic polymeric compound.

Among polymeric dispersants, a polymer having both a hydrophobic moiety and a hydrophilic moiety can be used as a water-insoluble dispersant. Regarding the hydrophilic structural unit, a structural unit having an acidic group is preferred, and a structural unit having a carboxyl group is more preferred. Examples of the water-insoluble resin include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a vinyl acetate-maleic acid copolymer, and a styrene-maleic acid copolymer.

More specifically, for example, the water-insoluble resins described in JP2005-41994A, JP2006-273891A, JP2009-084494A, and JP2009-191134A can be suitably used.

The weight average molecular weight of the polymeric dispersant is preferably 3,000 to 100,000, more preferably 5,000 to 50,000, even more preferably 5,000 to 40,000, and particularly preferably 10,000 to 40,000.

The weight average molecular weight means a value measured by gel permeation chromatography (GPC).

This GPC is performed using HLC-8020 GPC (manufactured by Tosoh Corporation), using three columns of TSKgel (registered trademark), SUPER MULTIPORE HZ-H (manufactured by Tosoh Corporation, 4.6 mm ID×15 cm), and using THF (tetrahydrofuran) as an eluent.

Furthermore, GPC is performed by setting the sample concentration at 0.45% by mass, the flow rate at 0.35 ml/min, the sample injection amount at 10 μl, and the measurement temperature at 40° C., using a differential refractive index (RI) detector.

The calibration curve is produced from eight samples of "standard sample TSK standard, polystyrene": "F-40", "F-20", "F-4", "F-1", "A-5000", "A-2500", "A-1000", and "n-propylbenzene".

From the viewpoints of self-dispersing properties and the aggregation rate in the case of being brought into contact with a treatment liquid, it is preferable that the polymeric dispersant includes a polymer having carboxyl groups, and the polymeric dispersant is preferably a polymer having carboxyl groups and having an acid value of 130 mg KOH/g or less, and more preferably a polymer having an acid value of 25 mg KOH/g to 120 mg KOH/g. Particularly preferably, a polymeric dispersant having carboxyl groups and having an acid value of 25 mg KOH/g to 100 mg KOH/g is effective.

The mixing mass ratio (p:s) between the pigment (p) and the dispersant (s) is preferably in the range of 1:0.06 to 1:3, more preferably in the range of 1:0.125 to 1:2, and even more preferably 1:0.125 to 1:1.5.

The content of the coating resin that coats the pigment is preferably 0.5% by mass to 3.0% by mass, more preferably 1.0% by mass to 2.8% by mass, and more preferably 1.2% by mass to 2.5% by mass, with respect to the total mass of the ink.

In a case in which the ink includes an inorganic salt that will be described below, the mass ratio between the coating resin and the inorganic salt (coating resin/inorganic salt) is preferably 10 to 250, more preferably 15 to 200, and even more preferably 30 to 150, from the viewpoint of suppressing ink viscosity reduction and suppressing the surface roughening of images. Surface roughening will be described below.

The volume average particle size (secondary particle size) of the resin-coated pigment (pigment in a dispersed state) is preferably 10 nm to 200 nm, more preferably 10 nm to 150 nm, and even more preferably 10 nm to 100 nm. The volume average particle size is 200 nm or less, color reproducibility becomes satisfactory, and the jetting properties at the time of jetting by an inkjet method become satisfactory. In a case in which the volume average particle size is 10 nm or more, light resistance becomes satisfactory. There are no particular limitations with regard to the particle size distribution of the resin-coated pigment, and the particle size distribution may be any of a wide particle size distribution and a monodisperse particle size distribution. Furthermore, it is also acceptable to use a mixture of two or more kinds of resin-coated pigments each having a monodisperse particle size distribution. Here, the volume average particle size of the resin-coated pigment in a dispersed state represents an average particle size in a state of being produced into an ink, and this is also similar to a so-called concentrated ink dispersion of the stage previous to ink production.

The volume average particle size can be measured by the method described above.

It is also preferable that the resin that coats the pigment in the resin-coated pigment is crosslinked by a crosslinking agent.

That is, the resin-coated pigment is preferably a resin-coated pigment in which at least a portion of the surface of the pigment is coated with a resin crosslinked by a crosslinking agent.

In regard to the resin-coated pigment in which at least a portion of the surface of the pigment is coated with a resin crosslinked by a crosslinking agent, the descriptions of paragraphs 0029 to 0048, paragraphs 0110 to 0118, and paragraphs 0121 to 0129 of JP2012-162655A, and paragraphs 0035 to 0071 of JP2013-47311A can be referred to.

The crosslinking agent is not particularly limited as long as it is a compound having two or more sites that react with the resin; however, above all, from the viewpoint of having excellent reactivity with carboxyl groups, the crosslinking agent is preferably a compound having two or more epoxy groups (bifunctional or higher-functional epoxy compound).

Specific examples of the crosslinking agent include ethylene glycol diglycidyl ether, polyethylene glycol diglycidyl ether, 1,6-hexanediol diglycidyl ether, diethylene glycol diglycidyl ether, dipropylene glycol diglycidyl ether, polypropylene glycol diglycidyl ether, and trimethylolpropane triglycidyl ether, and polyethylene glycol diglycidyl ether, diethylene glycol diglycidyl ether, and trimethylolpropane triglycidyl ether are preferred.

Regarding the crosslinking agent, a commercially available product can also be used. Examples of the commercially available product that can be used include DENACOL EX-321, EX-821, EX-830, EX-850, and EX-851 (manufactured by Nagase ChemteX Corporation).

The molar ratio between the crosslinking site of the crosslinking agent (for example, an epoxy group) and the site to be crosslinked of the resin (for example, a carboxyl group) is preferably 1:1 to 1:10, more preferably 1:1 to 1:5, and most preferably 1:1 to 1:1.5, from the viewpoints of the crosslinking reaction rate and the dispersion liquid stability after crosslinking.

—Acidic Dye—

The acidic dye is not particularly limited and can be selected as appropriate according to the purpose, and examples include an azo dye, an azomethine dye, a xanthene dye, and a quinone dye.

Specific examples include the acidic dyes described in paragraphs 0032 to 0034 of JP2010-94864A.

The acidic dyes may be used singly or in combination of two or more kinds thereof.

From the viewpoint of the image density, the content of the acidic dye in the ink is preferably 1% by mass to 20% by mass, and more preferably 2% by mass to 10% by mass, with respect to the total mass of the ink.

—Water—

It is preferable that the ink contains water.

The content of water is not particularly limited; however, the content of water can be adjusted to, for example, 50% by mass or more with respect to the total mass of the ink.

The content of water is preferably from 50% by mass to 80% by mass, more preferably from 50% by mass to 75% by mass, and even more preferably from 50% by mass to 70% by mass, with respect to the total mass of the ink.

—Water-Soluble Solvent—

The ink may include a water-soluble solvent.

Thereby, jettability from an inkjet head and the storage stability of the ink are further enhanced.

According to the present specification, the term "water-soluble" means a property of being soluble in water at a certain concentration or higher. Regarding the term "water-soluble", a property by which 5 g or more (more preferably 10 g or more) dissolves in 100 g of water at 25° C. is preferred.

Regarding the water-soluble solvent, known solvents can be used without particular limitations.

Examples of the water-soluble solvent include polyhydric alcohols, such as glycols such as glycerin, 1,2,6-hexanetriol, trimethylolpropane, ethylene glycol, propylene glycol, diethylene glycol, triethylene glycol, tetraethylene glycol, pentaethylene glycol and dipropylene glycol; and alkanediols such as 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; the sugars and sugar alcohols described in paragraph 0116 of JP2011-42150A; hyaluronic acids, alkyl alcohols having 1 to 4 carbon atoms; glycol ethers; 2-pyrrolidone, and N-methyl-2-pyrrolidone. These water-soluble solvents can be used by appropriately selecting one kind or two or more kinds thereof. Polyhydric alcohols are also useful as drying preventing agents or wetting agents, and examples include those described in paragraph 0117 of JP2011-42150A. Polyol compounds are preferable as penetrating agents, and examples of an aliphatic diol include the examples described in paragraph 0117 of JP2011-42150A.

Regarding water-soluble solvents other than those compounds described above, for example, the water-soluble solvent can be selected as appropriate from among the water-soluble solvents described in paragraphs 0176 to 0179 of JP2011-46872A, and the water-soluble solvents described in paragraphs 0063 to 0074 of JP2013-18846A.

The content of the water-soluble solvent (in the case of having two or more kinds, the total content) in the ink is preferably 10% by mass to 60% by mass with respect to the total mass of the ink.

As the total content is 10% by mass or more, jettability from a head and storage stability are further enhanced.

The total content is more preferably 15% by mass to 55% by mass, and even more preferably 20% by mass to 50% by mass, with respect to the total mass of the ink.

—Surfactant—

The ink may include at least one surfactant as necessary. The surfactant can be used as, for example, a surface tension adjusting agent.

Regarding the surfactant, a compound having a structure containing a hydrophilic moiety and a hydrophobic moiety in the molecule can be effectively used, and an anionic surfactant, a cationic surfactant, an amphoteric surfactant, a nonionic surfactant, and a betaine-based surfactant can all be used. Furthermore, the polymeric dispersants described above may also be used as the surfactant. Fluorine-based surfactants can also be preferably used.

From the viewpoint of suppressing the jetting interference of the ink, the surfactant is preferably a nonionic surfactant, and above all, an acetylene glycol derivative (acetylene glycol-based surfactant) is more preferred.

Examples of the acetylene glycol-based surfactant include 2,4,7,9-tetramethyl-5-decyne-4,7-diol and an alkylene oxide adduct of 2,4,7,9-tetramethyl-5-decyne-4,7-diol, and the acetylene glycol-based surfactant is preferably at least one selected from these. Examples of commercially available products of these compounds include E series such as OLFINE E1010, and SURFYNOL (registered trademark) series manufactured by Nissin Chemical Industry Co., Ltd.

Regarding surfactants other than the acetylene glycol-based surfactants, for example, fluorine-based surfactants are preferred. Examples of the fluorine-based surfactants include an anionic surfactant, a nonionic surfactant, and a betaine-based surfactant, and among these, an anionic surfactant is more preferred. Examples of the anionic surfactant include CAPSTONE FS-63, CAPSTONE FS-61 (manufactured by DuPont Company); FTERGENT 100, FTERGENT 110, and FTERGENT 150 (manufactured by Neos Co. Ltd.); and CHEMGUARD S-760P (manufactured by Chemguard, Inc.).

In a case in which the ink includes a surfactant (surface tension adjusting agent), from the viewpoint of satisfactorily performing jetting of the ink by an inkjet method, it is preferable that the ink includes the surfactant in an amount by which the surface tension of the ink can be adjusted to the range of 20 mN/m to 60 mN/m, and from the viewpoint of the surface tension, its more preferable that the ink includes the surfactant in an amount by which the surface tension can be adjusted to the range of 20 mN/m to 45 mN/m, and even more preferably 25 mN/m to 40 mN/m.

Here, the surface tension of the ink refers to a value measured using Automatic Surface Tensiometer CBVP-Z (manufactured by Kyowa Interface Science Co., Ltd.) under the conditions of a liquid temperature of 25° C. (±1° C.).

In a case in which the ink includes a surfactant, the specific amount of the surfactant is not particularly limited; however, the amount of the surfactant is preferably 0.1% by mass or more, more preferably 0.1% by mass to 10% by mass, and even more preferably 0.2% by mass to 3% by mass, with respect to the total mass of the ink.

—Urea—

The ink may include urea.

Since urea has a high moisturizing function, undesirable drying or solidification of the ink can be suppressed effectively by using urea as a solid wetting agent.

Furthermore, as the ink includes colloidal silica and urea, the maintenance properties (wiping operability) of the inkjet head and the like are more effectively enhanced.

In a case in which the ink includes urea, from the viewpoint of enhancing the maintenance properties (wiping operability), the content of urea in the ink is preferably from 1% by mass to 20% by mass, more preferably from 1% by mass to 15% by mass, and even more preferably from 3% by mass to 10% by mass.

In a case in which the ink includes urea and further includes the colloidal silica that will be described below, the ratio between the content of urea and the content of colloidal silica is not particularly limited; however, the content ratio of urea to the colloidal silica (urea/colloidal silica) is preferably 5 to 1,000, more preferably 10 to 500, and even more preferably 20 to 200.

—Colloidal Silica—

The ink may include colloidal silica as necessary.

As the ink includes colloidal silica, stability at the time of continuous jetting of the ink can be further enhanced.

Colloidal silica is a colloid formed from microparticles of an inorganic oxide containing silicon and having an average particle size of several hundred nanometers (nm) or less. The colloidal silica contains silicon dioxide (including hydrates thereof) as a main component, and may also contain aluminates (sodium aluminate, potassium aluminate, and the like) as components of small quantities.

The colloidal silica may also contain inorganic salts such as sodium hydroxide, potassium hydroxide, lithium hydroxide, and ammonium hydroxide; and organic salts such as tetramethylammonium hydroxide. These inorganic salts and organic salts act as, for example, stabilizers for colloid.

Regarding the colloidal silica, for example, the description of paragraphs 0043 to 0050 of JP2011-202117A can be referred to as appropriate.

The ink may include, if necessary, a silicic acid alkali metal salt instead of colloidal silica or in addition to colloidal silica. In regard to the silicic acid alkali metal salt, the description of paragraphs 0052 to 0056 of JP2011-202117A can be referred to as appropriate.

In a case in which the ink includes colloidal silica, the content of the colloidal silica is preferably 0.0001% by mass to 10% by mass, more preferably 0.01% by mass to 3% by mass, even more preferably 0.02% by mass to 0.5% by mass, and particularly preferably 0.03% by mass to 0.3% by mass, with respect to the total mass of the ink.

—Water-Soluble Polymeric Compound—

The ink may include at least one water-soluble polymeric compound, if necessary.

The water-soluble polymeric compound is not particularly limited, and any known water-soluble polymeric compound such as polyvinyl alcohol, polyacrylamide, polyvinylpyrrolidone, or polyethylene glycol can be used.

Examples of the water-soluble polymeric compound include the water-soluble polymeric compounds described in paragraphs 0026 to 0080 of JP2013-001854A.

In a case in which the ink includes a water-soluble polymeric compound, the content of the water-soluble polymeric compound is preferably 0.0001% by mass to 10% by mass, more preferably 0.01% by mass to 3% by mass, even more preferably 0.02% by mass to 0.5% by mass, and particularly preferably 0.03% by mass to 0.3% by mass, with respect to the total mass of the ink.

—Antifoaming Agent—

The ink may include at least one antifoaming agent, if necessary.

Examples of the antifoaming agent include a silicone-based compound (silicone-based antifoaming agent) and a pluronic-based compound (pluronic-based antifoaming agent), and among these, a silicone-based antifoaming agent is preferred.

The silicone-based antifoaming agent is preferably a silicone-based antifoaming agent having a polysiloxane structure.

Regarding the antifoaming agent, commercially available products can be used.

Examples of the commercially available products include BYK-012, 017, 021, 022, 024, 025, 038, and 094 (all manufactured by BYK-Chemie Japan K.K.); KS-537, KS-604, and KM-72F (all manufactured by Shin-Etsu Chemical Co., Ltd.); TSA-739 (manufactured by Momentive Performance Materials Japan LLC); and OLFINE AF104 (manufactured by Nissin Chemical Industry Co., Ltd.).

Among them, silicone-based antifoaming agents such as BYK-017, 021, 022, 024, 025, 094, KS-537, KS-604, KM-72F, and TSA-739 are preferred, and above all, BYK-024 is most preferred from the viewpoint of the jetting stability of the ink.

In a case in which the ink includes an antifoaming agent, the content of the antifoaming agent is preferably 0.0001% by mass to 1% by mass, and more preferably 0.001% by mass to 0.1% by mass, with respect to the total mass of the ink.

—Inorganic Salt—

The ink may include at least one inorganic salt, if necessary.

Thereby, surface roughening of images formed thereby is suppressed.

Here, surface roughening means a phenomenon in which in a region intermediate between a bright region (highlight) and a dark region (shadow) of an image (half tone region), areas of high ink density and areas of low ink density are unevenly distributed so that the image appears to be rough.

The "surface roughening" is not a phenomenon that occurs as a result of local insufficient aggregation of ink, such as conventional "bleeding" or "streaks", but is a phenomenon attributed to non-uniform aggregation caused by non-uniform distribution of the treatment liquid on the base material.

The inorganic salt is preferably a hydrochloride or a nitrate.

Among them, from the viewpoint that suppression of viscosity reduction of the ink and suppression of surface roughening are excellent, a monovalent salt is preferred, an alkali metal salt is more preferred, and lithium chloride, lithium nitrate, potassium chloride, or potassium nitrate is even more preferred.

The inorganic salts can be used singly or in combination of two or more kinds thereof.

In a case in which the ink includes an inorganic salt, the content of the inorganic salt (in a case in which there are two or more kinds, the total content) in the ink is not particularly limited; however, the content is preferably 0.01% by mass to 0.1% by mass, more preferably 0.02% by mass to 0.1% by mass, and particularly preferably 0.03% by mass to 0.1% by mass, with respect to the total mass of the ink.

—Resin Particles—

The ink may include resin particles. Thereby, scratch resistance of images is enhanced.

Particularly, in a case in which the ink includes resin particles, and an image is formed by applying this ink on a corrugated cardboard base material together with a treatment liquid that will be described below, scratch resistance of the image is further enhanced.

That is, the resin particles have a function of fixing an ink at the time of being contacted with a corrugated cardboard base material (particularly, in the case of applying a treatment liquid, an acidic compound that is a component of the treatment liquid), by being unstably dispersed in an ink to aggregate and increasing the viscosity of the ink. Thereby, scratch resistance of the image is further enhanced. Furthermore, adhesiveness of the ink to a corrugated cardboard base material, and the like are also further enhanced.

The resin particles may also be used in an aqueous dispersion state in which the resin particles are dispersed in water (so-called latex).

Owing to the fact that the resin particles are particles formed from a resin, the resin particles are distinguished from the above-mentioned pigment coated with a resin (resin-coated pigment).

Regarding the resin particles, for example, resin particles formed using a resin selected from a thermoplastic resin and a thermosetting resin may be mentioned.

These resins may be resins that have been further modified.

Examples of the resin that is used for forming the resin particles include an acrylic resin, an epoxy resin, a urethane resin, a polyether resin, a polyamide resin, an unsaturated polyester resin, a phenolic resin, a silicone resin, a fluororesin, a polyvinyl resin (for example, vinyl chloride, vinyl acetate, or polyvinyl butyral), an alkyd resin, a polyester resin (for example, a phthalic acid resin), and an amino material (for example, a melamine resin, a melamine-formaldehyde resin, an amino-alkyd co-condensation resin, a urea resin, and a carbamide resin).

Furthermore, the resin that forms the resin particles may be a copolymer containing two or more kinds of structural units that constituting a resin exemplified above, or may be a mixture of two or more kinds of resins. Furthermore, the resin particles may be not only particles themselves formed from a mixture of two or more kinds of resins, but may also be composite resin particles in which two or more kinds of resins are laminated so as to form, for example, a core/shell structure.

In the case of using resin particles in the ink, only one kind of resin particles may be used, or two or more kinds of resin particles may be used in combination.

Among the resins described above, particles of a urethane resin, an acrylic resin, a polyether resin, a polyester resin, and a polyolefin resin are preferred, and from the viewpoints of stability and the film quality of a formed film (image), a urethane resin or an acrylic resin is more preferred, while a urethane resin is particularly preferred.

The resin particles are more preferably resin particles obtained by a phase inversion emulsification method, and particles of a self-dispersing polymer that will be described below (self-dispersing polymer particles) are even more preferred.

Here, the self-dispersing polymer refers to a water-insoluble polymer that can form a dispersed state in an aqueous medium by means of the functional groups carried by the polymer itself (particularly, acidic groups such as carboxyl groups, or salts thereof), in a case in which the polymer is brought into a dispersed state by a phase inversion emulsification method in the absence of a surfactant.

Here, the dispersed state includes both an emulsified state (emulsion) in which a water-insoluble polymer is dispersed in a liquid state in an aqueous medium, and a dispersed state (suspension) in which a water-insoluble polymer is dispersed in a solid state in an aqueous medium.

Furthermore, the term "water-insoluble" implies that the dissolved amount in 100 parts by mass of water (25° C.) is 5.0 parts by mass or less.

An example of the phase inversion emulsification method may be a method of dissolving or dispersing a polymer in a solvent (for example, a water-soluble solvent), subsequently introducing the solution or dispersion directly into water without adding any surfactant, stirring and mixing the system in a state in which the salt-forming groups (for example, acidic groups) of the polymer have been neutralized, removing the solvent, and then obtaining an aqueous dispersion that is in an emulsified or dispersed state.

The self-dispersing polymer particles can be selected for use from the self-dispersing polymer particles described in paragraphs 0090 to 0121 of JP2010-64480A or paragraphs 0130 to 0167 of JP2011-068085A. Particularly, it is preferable to select and use polymer particles having a glass transition temperature of 100° C. or higher from among the self-dispersing polymer particles described in the patent documents described above.

~Physical Properties of Resin Particles~

The glass transition temperature (Tg) of the resin particles is not particularly limited; however from the viewpoint of the scratch resistance of the image, the glass transition temperature is preferably 40° C. or higher.

The upper limit of the glass transition temperature of the resin particles is preferably 250° C.

The glass transition temperature of the resin particles is preferably in the range of from 50° C. to 230° C.

The glass transition temperature of the resin particles can be controlled as appropriate according to a conventionally used method. For example, the glass transition temperature of the resin particles can be controlled by appropriately selecting the type or composition ratio of the monomers (polymerizable compound) that constitute the resin, the molecular weight of the polymer that constitutes the resin, and the like.

Regarding the glass transition temperature of the resin particles, measured Tg obtained by actual measurement is applied.

Specifically, the measured Tg means a value measured using a differential scanning calorimeter (DSC) EXSTAR6220 manufactured by SII Nanotechnology, Inc. under conventional measurement conditions. However, in a case in which measurement is difficult due to decomposition of the polymer or the like, calculated Tg that is calculated using the calculation formula described below is applied. The calculated Tg is calculated using the following Formula (A).

$$1/Tg = \Sigma(Xi/Tgi) \quad (A)$$

Here, the polymer as an object of calculation is assumed such that n kinds of monomer components from i=1 to i=n are copolymerized. Xi is the weight fraction of the i-th monomer ($\Sigma Xi=1$), and Tgi is the glass transition temperature (absolute temperature) of a homopolymer of the i-th monomer. However, the symbol $\Sigma$ represents the sum of values from i=1 to i=n. Regarding the value of the glass transition temperature of a homopolymer of each monomer (Tgi), the values disclosed in Polymer Handbook (3rd Edition) (written by J. Brandrup, E. H. Immergut (Wiley-Interscience, 1989)) are employed.

The weight average molecular weight of the polymer that constitutes the resin particles is preferably 3,000 to 200,000, more preferably 5,000 to 150,000, and even more preferably 10,000 to 100,000.

In a case in which the weight average molecular weight is 3,000 or more, water-solubility of the resin is decreased, and the resin can easily exist as resin particles. Furthermore, in a case in which the weight average molecular weight is adjusted to be 200,000 or less, the self-dispersing stability can be enhanced. The weight average molecular weight can be measured by the GPC method previously described.

The polymer that constitutes the resin particles is preferably a polymer having an acid value of 100 mg KOH/g or less from the viewpoints of self-dispersing properties and the aggregation rate in the case of being contacted with a treatment liquid, and a polymer having an acid value of 25 mg KOH/g to 100 mg KOH/g is more preferred.

The volume average particle size of the resin particles is preferably in the range of 1 nm to 200 nm, more preferably in the range of 1 nm to 150 nm, and even more preferably in the range of 1 nm to 100 nm. In a case in which the volume average particle size is 1 nm or more, production suitability is enhanced. In a case in which the volume average particle size is 200 nm or less, storage stability is enhanced. Furthermore, the particle size distribution of the resin particles is not particularly limited, and any of resin particles having a wide particle size distribution and resin particles having a monodisperse particle size distribution may be used. It is also acceptable to use a mixture of two or more kinds of resin particles.

The volume average particle size of the resin particles is measured by the method described above.

In a case in which the ink includes resin particles, the content of the resin particles (in the case of having two or more kinds, the total content) in the ink is not particularly limited; however, the content is preferably 0.3% by mass to 10.0% by mass, more preferably 0.5% by mass to 7.0% by mass, and even more preferably 1.0% by mass to 6.0% by mass, with respect to the total mass of the ink.

In a case in which the content is 0.3% by mass or more, scratch resistance of images can be further enhanced.

In a case in which the content is 10.0% by mass or less, jettability of the ink can be further enhanced, and it is also advantageous from the viewpoint of suppressing the generation of a precipitate in a low-temperature environment.

—Wax Particles—

The ink may include wax particles. Thereby, scratch resistance of images is enhanced.

The wax particles are distinguished from the pigment coated with a resin (resin-coated pigment) mentioned above, from the viewpoint that the wax particles are particles formed from a wax.

Examples of the wax particles include particles of natural waxes and synthetic waxes, such as plant-based waxes and animal-based waxes such as carnauba wax, candelilla wax, beeswax, rice wax, and lanolin; petroleum-based waxes such as paraffin wax, microcrystalline wax, polyethylene wax, polyethylene oxide wax, and petrolatum; mineral-based waxes such as montan wax and ozokerite; synthetic waxes such as carbon wax, Hoechst wax, polyolefin wax, and stearic acid amide; and an α-olefin-maleic anhydride copolymer, as well as mixed particles of these.

It is preferable that the wax particles are added in the form of a dispersion, and for example, the wax particles can be incorporated into the ink as a dispersion such as an emulsion. The solvent that can be used in the case of forming a dispersion is preferably water; however, the solvent is not limited to this, and for example, any organic solvent that is conventionally used can be selected as appropriate and used at the time of dispersing. In regard to the organic solvent, the description of paragraph 0027 of JP2006-91780A can be referred to.

Regarding the wax particles, one kind can be used alone, or a plurality of kinds can be used as a mixture.

Regarding the wax particles, a commercially available product that is sold in the market may be used. Examples of commercially available products include NOPCOAT PEM17 (manufactured by San Nopco, Ltd.), CHEMI-PEARL (registered trademark) W4005 (manufactured by Mitsui Chemicals, Inc.), AQUACER515 and AQUACER593 (all manufactured by BYK Chemie Japan K.K.), and SELOSOL 524 (manufactured by Chukyo Yushi Co., Ltd.).

Among the materials described above, preferred wax particles are preferably particles of carnauba wax and polyolefin wax, and particles of carnauba wax are particularly preferred from the viewpoint of scratch resistance of images.

In a case in which the ink includes both the above-mentioned resin particles and wax particles, the content ratio of the resin particles and the wax particles in the ink is preferably in the range of resin particles:wax particles=1:5 to 5:1 (solid content ratio), more preferably in the range of resin particles:wax particles=1:2 to 2:1, and particularly preferably 1.2:1 to 1.7:1. When the content ratio is in the range described above, excellent scratch resistance of images is obtained.

—Other Components—

The ink may include other components as necessary, in addition to the components described above.

Examples of the other components include known additives such as a solid wetting agent, a discoloration inhibitor, an emulsion stabilizer, a penetration enhancer, an ultraviolet absorber, an antiseptic agent, an antifungal agent, a pH adjusting agent, a viscosity adjusting agent, a rust inhibitor, and a chelating agent.

~Preferred Physical Properties of Ink~

There are no particular limitations on the physical properties of the ink; however, the following physical properties are preferred.

It is preferable that the ink has a pH of 7.5 or higher at 25° C., from the viewpoint of dispersion stability.

The pH is preferably pH 7.5 to pH 13, and more preferably pH 7.5 to pH 10. The pH is a value measured using a pH meter, WM-50EG (manufactured by DKK-Toa Corporation) under the conditions of 25° C.

The viscosity of the ink is preferably in the range of 0.5 mPa·s to 20 mPa·s, and more preferably in the range of 4 mPa·s to 15 mPa·s, from the viewpoint of jettability.

The viscosity is a value measured using a viscometer, TV-22 (manufactured by Toki Sangyo Co., Ltd.) under the conditions of 25° C.

The surface tension at 25° C. of the ink is preferably 60 mN/m or less, more preferably 18 mN/m to 50 mN/m, and even more preferably 20 mN/m to 45 mN/m. The surface tension is a value measured by a plate method using Automatic Surface Tensiometer, CBVP-Z (manufactured by Kyowa Interface Science Co., Ltd.) under the conditions of 25° C.

(Treatment Liquid)

It is preferable that the ink set further includes a treatment liquid containing an acidic compound, in addition to the above-mentioned five color inks. As the ink set includes a treatment liquid, in a case in which an acidic compound, which is a component included in the treatment liquid, is brought into contact with the ink on a corrugated cardboard base material, the components in the ink aggregate on the corrugated cardboard base material, and therefore, penetration of the ink into the corrugated cardboard base material can be suppressed.

—Acidic Compound—

It is preferable that the treatment liquid includes at least one acidic compound.

Examples of the acidic compound include compounds that can lower the pH of the ink.

Regarding the acidic compound, any of an organic acidic compound and an inorganic acidic compound may be used, and two or more kinds of compounds selected from organic acidic compounds and inorganic acidic compounds may be used in combination.

—Organic Acidic Compound—

The organic acidic compound may be an organic compound having an acidic group.

Examples of the acidic group include a phosphoric acid group, a phosphonic acid group, a phosphinic acid group, a sulfuric acid group, a sulfonic acid group, a sulfinic acid group, and a carboxyl group. The acidic group is preferably a phosphoric acid group or a carboxyl group, and more preferably a carboxyl group, from the viewpoint of the aggregation rate of the ink.

Preferred examples of the organic compound having a carboxyl group (organic carboxylic acid) include polyacrylic acid, acetic acid, glycolic acid, malonic acid, malic acid (preferably, DL-malic acid), maleic acid, ascorbic acid, succinic acid, glutaric acid, fumaric acid, citric acid, tartaric acid, phthalic acid, 4-methylphthalic acid, lactic acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compounds, and salts thereof (for example, polyvalent metal salts). These compounds may be used singly, or two or more kinds thereof may be used in combination.

Regarding the organic carboxylic acid, from the viewpoint of the aggregation rate of the ink, it is preferable that the ink includes a divalent or higher-valent carboxylic acid (hereinafter, also referred to as polyvalent carboxylic acid); more preferably includes at least one selected from the group consisting of malonic acid, malic acid, maleic acid, succinic acid, glutaric acid, fumaric acid, tartaric acid, 4-methylphthalic acid, and citric acid; and even more preferably includes at least one selected from the group consisting of malonic acid, malic acid, tartaric acid, and citric acid.

It is preferable that the organic acidic compound has a low pKa value.

Thereby, the surface charge of the coloring materials and the like in the ink, which has been dispersed and stabilized by weakly acidic functional groups such as carboxyl groups, can be reduced by bringing the coloring materials and the like into contact with the an organic acidic compound having a lower pKa value, and dispersion stability can be lowered.

It is preferable that the organic acidic compound included in the treatment liquid is a compound having a low pKa value, high solubility in water, and a valence of 2 or higher; and it is more preferable that the organic acidic compound is a divalent or trivalent acidic substance having superior buffering capability in a region of a pH that is lower than the pKa of the functional groups (for example, carboxyl groups) that stabilize the dispersion of the components (particularly, coloring materials) in the ink.

—Inorganic Acidic Compound—

Examples of the inorganic acidic compound include phosphoric acid, nitric acid, nitrous acid, sulfuric acid, and hydrochloric acid; however, the inorganic acidic compound is not particularly limited to these. Regarding the inorganic acidic compound, phosphoric acid is most preferred from the viewpoint of the aggregation rate of the ink.

The total amount of the acidic compound included in the treatment liquid is not particularly limited; however, from the viewpoint of the aggregation rate of the ink, the total amount is preferably 5% by mass to 40% by mass, and more preferably 10% by mass to 30% by mass, with respect to the total mass of the treatment liquid.

In a case in which an organic acidic compound and an inorganic acidic compound are used in combination as the acidic compound, the content ratio between the organic acidic compound and the inorganic acidic compound is such that, from the viewpoint of the aggregation rate, the content of the inorganic acidic compound with respect to the content of the organic acidic compound is preferably 5 mol % to 50 mol %, more preferably 10 mol % to 40 mol %, and even more preferably 15 mol % to 35 mol %.

In the treatment liquid, another aggregating component such as a polyvalent metal salt or a cationic polymer may also be used in combination with the acidic compound, if necessary.

In regard to the polyvalent metal salt or the cationic polymer, for example, the polyvalent metal salt or the cationic polymer described in paragraphs 0155 to 0156 of JP2011-042150A can be used.

—Water—

It is preferable that the treatment liquid includes water.

The content of water is preferably 50% by mass to 90% by mass, and more preferably 60% by mass to 80% by mass, with respect to the total mass of the treatment liquid.

—Water-Soluble Solvent—

It is preferable that the treatment liquid includes at least one water-soluble solvent.

Regarding the water-soluble solvent, specifically, the above-mentioned water-soluble solvents that can be incorporated into the ink can also be similarly used for the treatment liquid.

Among them, from the viewpoint of penetrability of the treatment liquid into the base material, the water-soluble solvent is preferably a polyalkylene glycol or a derivative thereof; more preferably at least one selected from a diethylene glycol monoalkyl ether, a triethylene glycol monoalkyl ether, dipropylene glycol, a tripropylene glycol monoalkyl ether, polyoxypropylene glyceryl ether, and polyoxyethylene polyoxypropylene glycol; and even more preferably at least one selected from tripropylene glycol monomethyl ether (TPGmME) and diethylene glycol monobutyl ether (DEGmBE).

The content of the water-soluble solvent in the treatment liquid is preferably 3% by mass to 20% by mass, and more preferably 5% by mass to 15% by mass, with respect to the total mass of the treatment liquid, from the viewpoint of coatability or the like.

—Surfactant—

The treatment liquid may include at least one surfactant.

The surfactant can be used as a surface tension adjusting agent. Examples of the surface tension adjusting agent include a nonionic surfactant, a cationic surfactant, an anionic surfactant, and a betaine surfactant. Among them, from the viewpoint of the aggregation rate of the ink, a nonionic surfactant or an anionic surfactant is preferred.

Examples of the surfactant include those compounds listed as surfactants in pages 37 and 38 of JP59-157636A, and Research Disclosure No. 308119 (1989). Further examples include the fluorine (fluoroalkyl-based)-based surfactants and silicone-based surfactants described in JP2003-322926A, JP2004-325707A, and JP2004-309806A.

The content of the surfactant in the treatment liquid is not particularly limited; however, it is preferable that the content is a content at which the surface tension of the treatment liquid becomes 60 mN/m or less, more preferably a content at which the surface tension becomes 20 mN/m to 50 mN/m, and even more preferably a content at which the surface tension becomes 30 mN/m to 45 mN/m.

—Nitrogen-Containing Heterocyclic Compound—

The treatment liquid may include a nitrogen-containing heterocyclic compound. Thereby, any apparatus used for applying the treatment liquid becoming rusty can be prevented.

The structure of the nitrogen-containing heterocyclic compound is preferably a nitrogen-containing 5-membered ring structure or 6-membered ring structure, and above all, a nitrogen-containing 5-membered ring structure is preferred.

Among nitrogen-containing 5-membered ring structures and nitrogen-containing 6-membered ring structures, a 5-membered or 6-membered heterocyclic ring structure preferably containing at least one atom selected from a carbon atom, a nitrogen atom, an oxygen atom, a sulfur atom, and a selenium atom is preferred. The heterocyclic ring may be condensed with a carbon aromatic ring or a heteroaromatic ring.

Examples of the heterocyclic ring include a tetrazole ring, a triazole ring, an imidazole ring, a thiadiazole ring, an oxadiazole ring, a selenadiazole ring, an oxazole ring, a thiazole ring, a benzoxazole ring, a benzothiazole ring, a benzimidazole ring, a pyrimidine ring, a triazaindene ring, a tetraazaindene ring, and a pentaazaindene ring.

—Other Additives—

The treatment liquid may include other additives in addition to the components described above, if necessary.

The other additives that can be incorporated into the treatment liquid are similar to the other additives that can be incorporated into the ink.

—Physical Properties of Treatment Liquid—

The viscosity of the treatment liquid is preferably in the range of 0.5 mPa·s to 10 mPa·s, and more preferably in the range of 1 mPa·s to 5 mPa·s, from the viewpoint of the aggregation rate of the ink. The viscosity is a value measured using a viscometer, TV-22 (manufactured by Toki Sangyo Co., Ltd.) under the conditions of 25° C.

The surface tension at 25° C. of the treatment liquid is preferably 60 mN/m or less, more preferably 20 mN/m to 50 mN/m, and even more preferably 30 mN/m to 45 mN/m. In a case in which the surface tension of the treatment liquid is in the range described above, it is advantageous because the occurrence of coating unevenness is suppressed. The surface tension of the treatment liquid is measured by a plate method using an automatic surface tensiometer, CBVP-Z (manufactured by Kyowa Interface Science Co., Ltd.).

<Image Forming Method>

The image forming method includes a step of applying the inks included in the ink set of the present disclosure as described above, onto a corrugated cardboard base material by an inkjet method (hereinafter, also referred to as "ink applying step").

The image forming method may also include a step of preparing a corrugated cardboard base material.

In a case in which the ink set of the present disclosure includes a treatment liquid, the image forming method may include a step of applying the treatment liquid on the corrugated cardboard base material (hereinafter, also referred to as "treatment liquid applying step").

Furthermore, in a case in which the image forming method includes a treatment liquid applying step, the image forming method may include a drying step of drying the treatment liquid or ink applied in the various steps, after the respective steps of the treatment liquid applying step and the ink applying step.

[Ink Applying Step]

The ink applying step is a step of applying an ink by an inkjet method using the ink set of the present disclosure described above, on a corrugated cardboard base material.

In regard to the ink applying step, not all of the five color inks may be applied; however, from the viewpoint of color reproducibility, and particularly from the viewpoint of the color reproducibility of the particular six colors, it is more preferable to apply inks of two or more colors including the α ink on the base material, and it is even more preferable to apply inks of three or more colors including the α ink on the base material.

By applying the inks included in the ink set of the present disclosure on a corrugated cardboard base material by an inkjet method, an image exhibiting excellent color reproducibility of the 18 colors defined in JCS M 0001:2000 can be formed on the corrugated cardboard base material.

(Inkjet Method)

In the ink applying step, inks are applied by an inkjet method.

Application of inks by an inkjet method is carried out by jetting the inks onto a corrugated cardboard base material by supplying energy. As a preferable inkjet method for the present disclosure, the method described in paragraphs 0093 to 0105 of JP2003-306623A can be applied.

The inkjet method is not particularly limited and may adopt any one of known systems, for example, a charge control system that jets out ink by utilizing an electrostatic attractive force; a drop-on-demand system that utilizes the vibration pressure of a piezoelectric element (pressure pulse system); an acoustic inkjet system that converts an electric signal into an acoustic beam, irradiates an ink with the acoustic beam, and jets out the ink by utilizing a radiation pressure; and a thermal inkjet (BUBBLEJET (registered trademark)) system that forms air bubbles by heating an ink, and utilizes the pressure thus produced. Regarding the inkjet method, particularly, an inkjet method in which an ink that has been subjected to the action of thermal energy by the method described in JP1979-59936A (JP-S54-59936A) undergoes a rapid volume change, and the ink is jetted out through a nozzle by means of an acting force caused by this state change, can be effectively utilized.

Inkjet heads are classified into shuttle systems that use a serial head having a short length and perform recording while scanning the head in the width direction of the base material; and line systems that use a line head in which recording elements are arranged correspondingly over the whole length of one side of the base material. According to the line system, image formation can be carried out over the entire surface of the base material by scanning the base material in a direction that intersects the direction of arrangement of the recording elements, and a conveyance system such as a carriage that scans the head of a short length becomes unnecessary. Furthermore, movement of the carriage and complicated scan control with the base material become unnecessary, and since only the base material moves, speed-up of the recording speed can be realized compared to the shuttle system.

Since image formation on a corrugated cardboard base material requires productivity, it is preferable that image formation is performed by a single pass printing method. The printing speed is preferably 50 m/min or higher, and more preferably 100 m/min or higher.

Furthermore, regarding the method of forming an image on a corrugated cardboard base material, there is available a post-printing method of forming an image on a corrugated cardboard obtained by adhering liners and a paper that has been processed into a corrugated form (corrugating medium), and it is preferable from the viewpoint of preventing loss of the paper.

In the case of using the post-printing method, concavities and convexities originating from lamination occur at the printed surface that has been laminated, non-smoothness originating from warpage of the base material occurs. Therefore, the distance between the inkjet head and the base material is preferably 3 mm or more, more preferably 5 mm or more, and particularly preferably 10 mm or more.

The jetting amount of a single color ink per unit area according to an inkjet method is preferably 17,360 picoliters (pl)/mm$^2$ or less, more preferably 9,920 pl/mm$^2$ or less, and even more preferably 8,680 pl/mm$^2$ or less. In a case in which the jetting amount is 17,360 pl/mm$^2$ or less, the occurrence of mottles caused by coalescence of liquid droplets can be suppressed.

The jetting amount per unit area is determined by the number of jetting times from the inkjet head per unit area×jetting amount.

Furthermore, an image is formed at a high speed, and in a case in which the distance between the inkjet head and the base material is large, and in a case in which the amount of ink jetted out from the inkjet head is small, differences in the landing positions occur. Thus, there is a tendency that satisfactory images may not be easily formed. Therefore, the amount of liquid droplets jetted from one nozzle is preferably 10 pl or more, and more preferably 25 pl or more, per time of jetting. From the viewpoint of reducing mottles, the amount of liquid droplets jetted from one nozzle is preferably 40 pl or less per time of jetting.

In order to perform single pass printing, which is a preferred embodiment of the image forming method, since the head is disposed perpendicularly to the direction of paper conveyance, the nozzle density (npi (nozzles per inch)) of the inkjet head has the same value as the printing density (dpi (dots per inch)) in a direction perpendicular to the paper conveyance. Therefore, the nozzle density of the inkjet head used in the present disclosure in order to avoid the occurrence of mottles as described above is preferably 600 nozzles per inch (600 npi) or lower, and more preferably 400 nozzles per inch (400 npi) or lower.

In order to achieve the nozzle density described above, (1) a method of using an inkjet head having a nozzle density in a preferred range; (2) a method of using inkjet heads each having a nozzle density that is smaller than or equal to a preferred nozzle density, in combination; (3) a method of disposing an inkjet head having a nozzle density that is smaller than or equal to a preferred nozzle density, obliquely to the direction of paper conveyance, and thereby bringing adjacent nozzles close to a direction perpendicular to the direction of paper conveyance; and (4) a method of using a head having a nozzle density that is larger than or equal to the nozzle density of a preferred range, and using only a necessary number of nozzles, may be considered. However, from the viewpoint of suppressing the apparatus price to a low level, it is preferable to use the method (1), (2), or (3).

Examples of the head that is preferably used in the image forming method of the present disclosure include an SG1024 head manufactured by Fujifilm Dimatix, Inc.: 400 npi), a QE head (manufactured by Fujifilm Dimatix, Inc.: 100 npi), a QS head (manufactured by Fujifilm Dimatix, Inc.: 100 npi), and a POLARIS head (manufactured by Fujifilm Dimatix, Inc.: 200 npi). It is preferable that the SG1024 head is used for method (1); it is preferable that the QE head and the QS head are used for method (2) or (3); and it is preferable that the POLARIS head is used for method (2). Regarding the minimum liquid droplet amount of these heads, heads having a minimum liquid droplet amount of about 10 picoliters, 30 picoliters, and 80 picoliters are lined up, and it is preferable to use a head having a minimum liquid droplet amount of 30 picoliters.

Particularly, in the image forming method of the present disclosure, an embodiment in which the nozzle density of the head is 600 npi or smaller, and the ink is applied in a liquid droplet amount of 10 picoliters or more, is preferred; and an embodiment in which the nozzle density of the head is 400 npi or smaller, and the ink is applied such that the amount of liquid droplets jetted out from one nozzle is from 25 picoliters to 40 picoliters per time of jetting, is more preferred.

(Corrugated Cardboard Base Material)

In the image forming method, an image is formed on a corrugated cardboard base material. The corrugated cardboard base material is a paper base material that is produced by adhering at least one sheet of plane paper (liner) to a paper that has been processed into a corrugated form (corrugating medium).

Regarding the corrugated cardboard base material, from the viewpoint that the effect of color reproducibility of the 18 colors defined in JCS M 0001:2000 is exhibited more noticeably, a corrugated cardboard base material in which the lightness $L^*$ of the surface to which ink is applied is $L^*$ 90 is preferred, a corrugated cardboard base material in which $L^*$ 80 is more preferred, and a corrugated cardboard base material in which $L^* \leq 70$ is even more preferred. Furthermore, a corrugated cardboard base material in which $L^* \geq 10$ is preferred, and a corrugated cardboard base material in which $L^* \geq 30$ is more preferred.

From a similar viewpoint, the corrugated cardboard base material is preferably such that the $L^*$ of the surface to which ink is applied is 52 to 72, $a^*$ is 4 to 14, and $b^*$ is 23 to 33.

Examples of the liner that is used for the corrugated cardboard base material include K liner, C liner, lightweight liner, and various colored liners manufactured by Oji Materia Co., Ltd., Rengo Co., Ltd., and the like.

Examples of the corrugating medium that is used for the corrugated cardboard base material include general corrugating media, reinforced media, lightweight corrugating media, and water-resistant corrugating media manufactured by Oji Materia Co., Ltd., Rengo Co., Ltd., and the like.

Regarding the corrugated cardboard base material, a product produced by processing the above-mentioned corrugating medium into a corrugated form, and adhering the above-mentioned liner to the processed corrugating medium, can also be used, and in the present disclosure, it is preferable to use a corrugated cardboard obtained after adhesion. Examples of the corrugated cardboard base material obtained by adhering a liner to a corrugating medium that has been processed into a corrugated form, include both-sided corrugated cardboard produced by interposing a corrugating medium between two sheets of a liner and adhering the corrugated cardboard; a single-sided corrugated cardboard produced by adhering one sheet of a liner to a corrugating medium; a double-walled both-sided corrugated cardboard in which a liner and a corrugating medium are laminated in the order of liner/corrugating medium/liner/corrugating medium/liner; and a triple-walled both-sided corrugated cardboard in which a liner and a corrugating medium are laminated in the order of liner/corrugating medium/liner/corrugating medium/liner/corrugating medium/liner.

[Treatment Liquid Applying Step]

In a case in which the ink set of the present disclosure includes a treatment liquid, it is preferable that the image forming method includes a treatment liquid applying step of applying the treatment liquid onto a corrugated cardboard base material.

The treatment liquid applying step is a step of applying a treatment liquid containing at least one acidic compound that aggregates the components in the ink, onto a corrugated cardboard base material. As a result of applying the treatment liquid on a corrugated cardboard, the components in the ink that is applied in the ink applying step aggregate on the corrugated cardboard base material, and therefore, the penetration of the components in the ink into the corrugated cardboard base material can be suppressed.

(Application of Treatment Liquid)

Application of the treatment liquid can be carried out by applying a known method such as a coating method, an inkjet method, or an immersion method. Coating can be performed according to a known coating method of using a bar coater, an extrusion die coater, an air doctor coater, a blade coater, a rod coater, a knife coater, a squeeze coater, a reverse roll coater, or a bar coater. The details of the inkjet method are as previously explained in regard to the ink applying step.

It is preferable that the treatment liquid applying step is provided before the ink applying step of using an ink.

Specifically, it is preferable that a treatment liquid is applied on a corrugated cardboard base material, before an ink is applied, in order to aggregate the components in the ink (for example, coloring materials) in advance, an ink is applied so as to contact the treatment liquid that has been applied on the corrugated cardboard base material, and thus an image is formed. Thereby, inkjet recording can be speeded up, and an image exhibiting excellent color reproducibility is obtained.

The application amount of the treatment liquid is not particularly limited as long as aggregation of the ink is enabled; however, preferably, the application amount of the treatment liquid can be an amount that adjusts the application amount of the acidic compound to be 0.01 g/m² or more. Above all, an amount that adjusts the application amount of the acidic compound to be 0.1 $g/m^2$ to 5.0 $g/m^2$ is preferred. In a case in which the application amount of the acidic compound is 0.01 $g/m^2$ or more, satisfactory high-speed aggregability can be maintained in accordance with the various forms of usage of the ink. Furthermore, in a case in which the application amount of the acidic compound is 5.0 $g/m^2$ or less, it is preferable from the viewpoint that the acidic compound does not affect the surface characteristics of the corrugated cardboard base material to which the acidic compound has been applied (change in gloss, or the like).

In regard to the image forming method, a drying step may be provided after the treatment liquid applying step so that after the treatment liquid is applied on the base material, the treatment liquid on the base material can be dried until an ink is applied. Thereby, a large amount of the acidic compound in the treatment liquid can be allowed to remain on the surface of the corrugated cardboard base material, and as a result, an image exhibiting excellent color reproducibility can be formed with a small application amount. Preferred embodiments of the means and method for drying of the treatment liquid are similar to the means and method for drying in the preferred embodiments of the drying step that will be described below.

[Drying Step]

The image forming method may include a step of drying the treatment liquid or the ink (drying step), which are applied in various steps, after any one step or both steps of the treatment liquid applying step and the ink applying step.

It is particularly preferable that the image forming method includes the drying step after the ink applying step.

Examples of the means for performing heated drying include known heating means such as a heater; known air-blowing means such as a dryer; and means combining these.

Examples of the method for performing heated drying include a method of applying heat by means of a heater or the like, through the opposite side of the image-formed surface of the base material; a method of blowing warm air or hot air toward the image-formed surface of the base material; a method of applying heat by means of an infrared heater through the image-formed surface or through the opposite side of the image-formed surface of the base material; and a method of combining a plurality of these methods.

The heating temperature employed at the time of performing heated drying is preferably 60° C. or higher, more preferably 65° C. or higher, and particularly preferably 70° C. or higher.

The upper limit of the heating temperature is not particularly limited; however, for example, the heating temperature is preferably 100° C. or lower, and more preferably 90° C. or lower.

The time for heated drying is not particularly limited; however, the heated drying is preferably 0.1 seconds to 30 seconds, more preferably 0.2 seconds to 20 seconds, and particularly preferably 0.5 seconds to 10 seconds.

~Inkjet Image Forming Apparatus~

The image forming apparatus that can be used for the image forming method is not particularly limited, and the known image forming apparatuses described in JP2010-83021A, JP2009-234221A, JP1998-175315A (JP-H10-175315A), and the like can be used.

In the following description, an example of the image forming apparatus that can be used for the image forming method will be explained with reference to FIG. 1 or FIG. 2.

Next, an example of an inkjet image forming apparatus that is suitable for performing the image forming method will be specifically explained with reference to FIG. 1.

FIG. 1 is a schematic configuration diagram illustrating the overall configuration example of an inkjet image forming apparatus.

As illustrated in FIG. 1, in the inkjet image forming apparatus, a treatment liquid applying unit 12 including an anilox roller 20 and a coating roller 22 that is in contact with this anilox roller 20, as roller materials that apply the treatment liquid; a treatment liquid drying zone 13 including a heating means (not shown in the diagram) of drying the treatment liquid thus applied; an ink jetting unit 14 that jets out various inks; and an ink drying zone 15 for drying the jetted ink, are arranged in sequence toward the direction of conveyance of the base material (direction of the arrow in the diagram).

Base materials supplied to this inkjet image forming apparatus are conveyed from a paper feeding unit that feeds the base materials from a case charged with the base materials, by a conveyance roller, to a treatment liquid applying unit 12, a treatment liquid drying zone 13, an ink jetting unit 14, and an ink drying zone 15 in this order, and the base materials are accumulated at an accumulation unit. The conveyance may also be achieved by employing a method of using a conveyance roller, as well as a drum conveying method of a drum-shaped member, a belt conveying method, and a stage conveying method of using a stage.

Among a plurality of disposed conveyance rollers, at least one roller can be operated as a driving roller to which electric power of a motor (not shown in the diagram) is transferred. By rotating the motor-rotated driving roller at a constant speed, the base materials are conveyed in a predetermined conveyance quantity in a predetermined direction.

In the treatment liquid applying unit 12, an anilox roller 20 disposed such that a portion is immersed in a storage tray that stores a treatment liquid; and a coating roller 22 that is in contact with the anilox roller 20. The anilox roller 20 is a roller material for supplying a predetermined amount of the treatment liquid to the coating roller 22 disposed to face the recording surface of the base material. The treatment liquid will be uniformly applied on a base material by the coating roller 22, to which an adequate amount of the treatment liquid has been supplied from the anilox roller 20.

The coating roller 22 is configured to enable conveyance of the base materials by forming a pair with a facing roller 24, and the base materials are sent to the treatment liquid drying zone 13 by passing through the coating roller 22 and the facing roller 24.

On the downstream side of the base material conveyance direction of the treatment liquid applying unit 12, a treatment liquid drying zone 13 is disposed. The treatment liquid drying zone 13 can be configured using known heating means such as a heater; air-blowing means utilizing air blowing, such as a dryer; or means combining these. Examples of the heating means include a method of installing a heat-generating body such as a heater on the opposite side of the treatment liquid-applied surface of the base material (for example, in the case of automatically conveying the base material, the lower part of the conveying mechanism that conveys the base material mounted thereon); a method of blowing warm air or hot air toward the treatment liquid-applied surface of the base material; and a heating method of using an infrared heater, and it is also acceptable to perform heating by combining a plurality of these means.

Furthermore, since the surface temperature of the base material changes depending on the type of the base material (material, thickness, or the like), the environmental temperature, and the like, it is preferable to provide a measurement unit that measures the surface temperature of the base material; and a controlling mechanism that feeds back the value of the surface temperature of the base material measured by the measurement unit to a heating control unit, and to applying the treatment liquid while controlling the temperature. Regarding the measurement unit that measures the surface temperature of the base material, a contact type or non-contact type thermometer is preferred.

Furthermore, solvent removal may be performed using a solvent removing roller or the like. As another embodiment, a method of removing any excess solvent from the base material using an air knife is also used.

An ink jetting unit 14 is disposed on the downstream side in the direction of base material conveyance of the treatment liquid drying zone 13. In the ink jetting unit 14, recording heads (ink jetting heads) 30K, 30C, 30M, 30Y, and 30α, which are respectively connected to ink storage units that store various color inks of black (K), cyan (C), magenta (M), yellow (Y), and α, all being inks, are disposed. In the ink storage units that are not shown in the diagram, inks corresponding to the various color tones are stored, and on the occasion of recording an image, the inks will be supplied to the various ink jetting heads 30K, 30C, 30M, 30Y, and 30α, as necessary.

The ink jetting heads 30K, 30C, 30M, 30Y, and 30α jet out inks corresponding to various images, through jetting nozzles disposed to face the recording surface of the base material. Thereby, various color inks are applied on the recording surface of the base material, and a multi-color image is recorded.

The ink jetting heads 30K, 30C, 30M, 30Y, and 30α are all full-line heads, each of which has a large number of jetting ports (nozzles) arranged across the maximum recording width of an image to be recorded on the base material (maximum recording width). Compared to a serial type head that performs recording while a short-length shuttle head reciprocatingly scans in the width direction of the base material (direction orthogonally intersecting the conveyance direction on the base material conveyance surface), image formation on the base material is performed at a high speed. In regard to the image forming method according to the present disclosure, any of recording by a system that enables image formation by a serial type or image formation at a relatively high speed, for example, a single-pass system that forms one line by one time of scanning, may be employed; however, according to the image forming method related to the present disclosure, high-resolution images having high reproducibility is obtained even by a single-pass system.

Here, the ink jetting heads 30K, 30C, 30M, 30Y, and 30α all have the same structure.

Although not shown in the diagram, these ink jetting heads each include a nozzle plate. The nozzle plate is provided with two-dimensionally arranged jetting holes.

It is preferable that the application amount of the treatment liquid and the application amount of the ink are regulated as necessary. For example, depending on the base material, the application amount of the treatment liquid may be changed for the purpose of regulating the physical properties such as viscoelasticity of aggregates that are produced as the treatment liquid mixes with the ink.

The ink drying zone 15 is disposed on the downstream side in the direction of base material conveyance of the ink jetting unit 14. The ink drying zone 15 can be configured similarly to the treatment liquid drying zone 13.

Furthermore, in the inkjet image forming apparatus, heating means that applies a heating treatment on the base material can be disposed in the conveyance path from the paper feeding unit to the accumulation unit. For example, by disposing a heating means at a position such as a position on the upstream side of the treatment liquid drying zone 13 or a position between the ink jetting unit 14 and the ink drying zone 15, it is possible to perform drying and fixing effectively by increasing the temperature of the base material.

Next, an example of the inkjet image forming apparatus suitable for performing the image forming method will be specifically explained with reference to FIG. 2.

Figure 2:
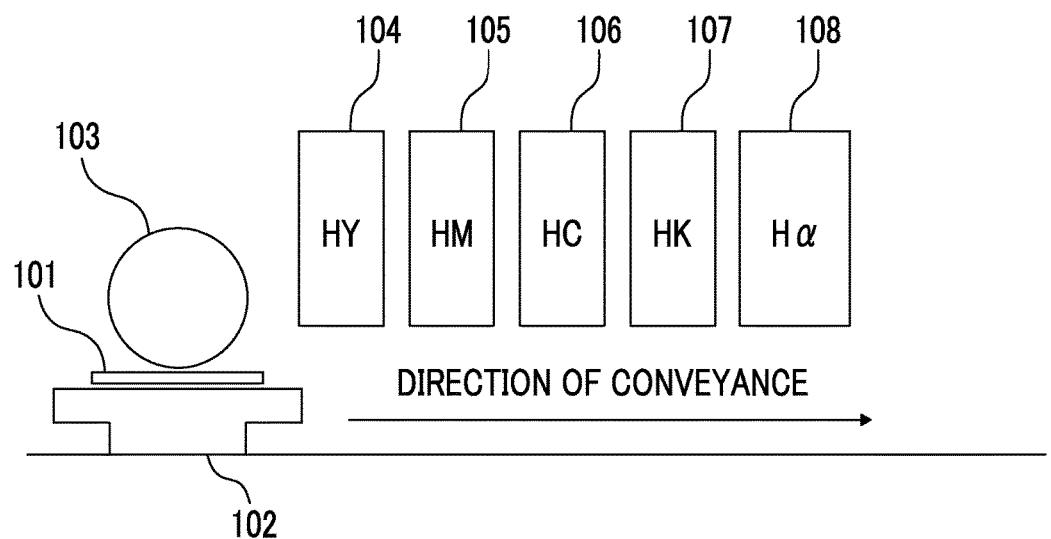
FIG. 2 is a schematic configuration diagram illustrating a configuration example of the inkjet image forming apparatus used in Example 2.

FIG. 2 is a schematic configuration diagram illustrating a configuration example of a roll conveyance type inkjet image forming apparatus.

As illustrated in FIG. 2, a roll conveyance type inkjet image forming apparatus includes a linear slider conveyance unit 102 that conveys a corrugated cardboard base material 101; a flexographic coater 103 that applies the treatment liquid; and a head for yellow ink (HY) 104, a head for magenta ink (HM) 105, a head for cyan ink (HC) 106, a head for black ink (HK) 107, and a head for α ink (Hα) 108, all of which jet out inks.

The corrugated cardboard base material 101 supplied to this inkjet image forming apparatus is fixed on the linear slider conveyance unit 102 and is conveyed in the conveyance direction (direction of arrow in the diagram) by the linear slider conveyance unit 102.

When the corrugated cardboard base material 101 is conveyed to the flexographic coater 103, head for yellow ink (HY) 104, head for magenta ink (HM) 105, head for cyan ink (HC) 106, head for black ink (HK) 107, or head for α ink (Hα) 108, the treatment liquid is applied on the flexographic coater, and various inks are applied to the various heads.

The various heads are respectively connected to the ink storage units that store corresponding various color inks (for example, yellow ink in the case of the head for yellow ink). In the various ink storage units that are not shown in the diagram, inks corresponding to the various color tones are stored, and the heads of various inks are supplied as necessary upon formation of an image.

The various heads respectively jet out inks corresponding to the image through jetting nozzles that are disposed to face the recording surface of the base material. Thereby, various inks are applied on the recording surface of a corrugated cardboard base material, and thus an image is formed.

EXAMPLES

Hereinafter, the present invention will be more specifically described by way of Examples; however, the invention is not intended to be limited to the following Examples as long as the gist is maintained.

<Evaluation of Color Reproducibility>

Example 1

Figure 3:
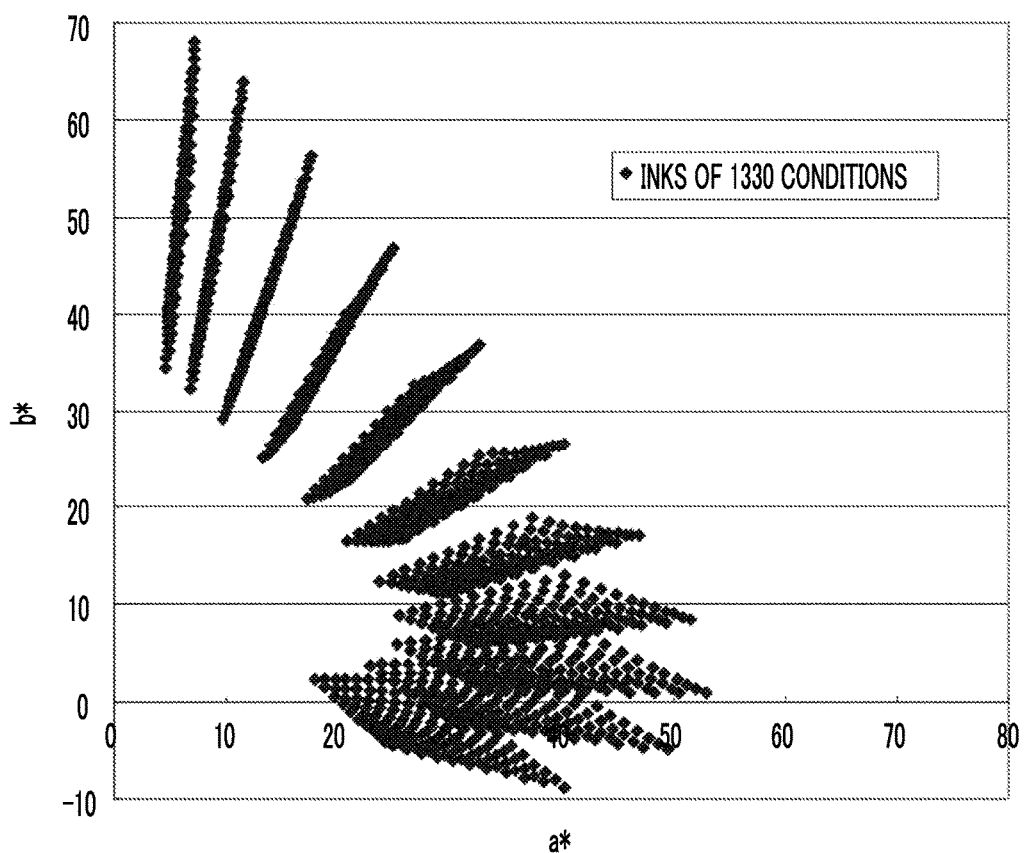
FIG. 3 is a graph obtained by plotting the relation between $a^*$ and $b^*$ of the inks used in Example 1.
Figure 4:
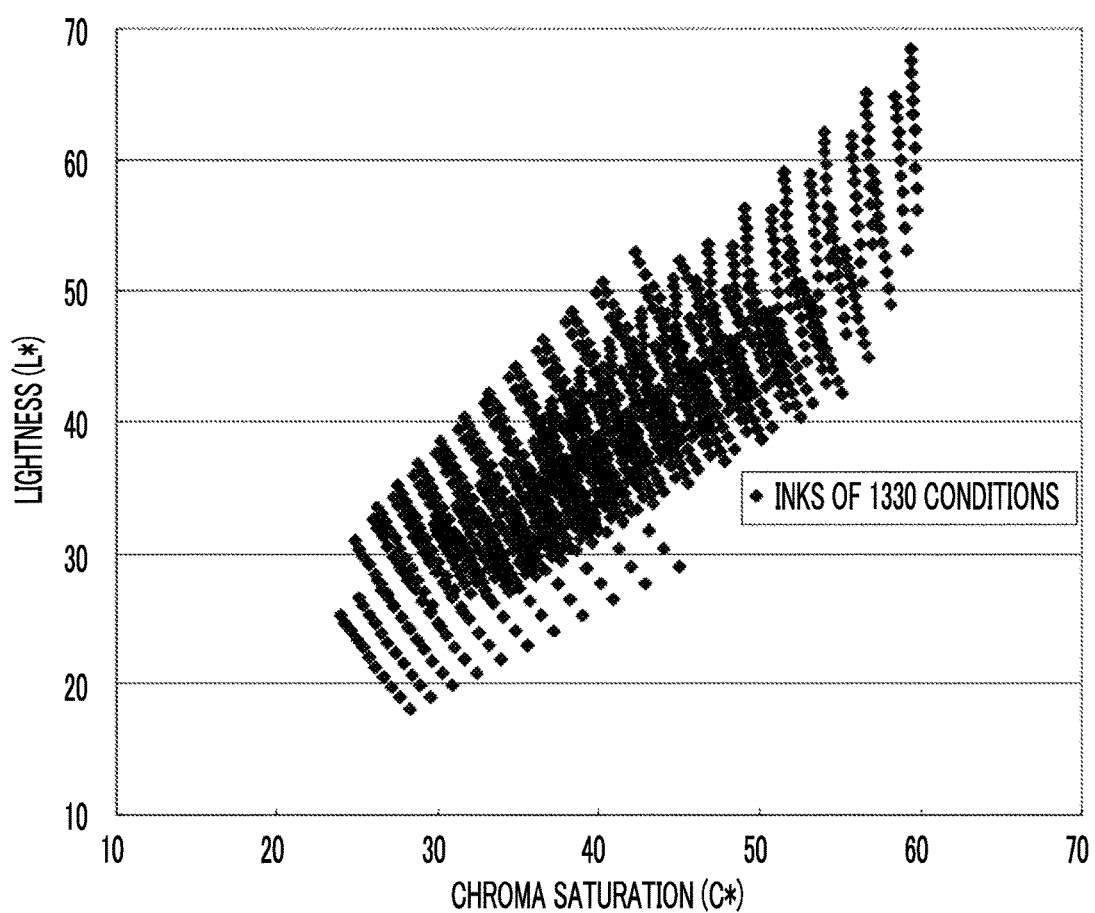
FIG. 4 is a graph obtained by plotting the relation between the lightness $L^*$ and the chroma saturation $C^*$ of the inks used in Example 1.

From a color reproduction range in which the hue angle h, chroma saturation C*, and lightness L* as parameters were respectively changed at a particular interval, inks of conditions 1330 (α ink and comparative inks) as shown in FIG. 3 and FIG. 4 were selected, with regard to the four color inks including a cyan ink, a magenta ink, a yellow ink, and a black ink, from the viewpoint of enhancing the color reproducibility for those colors of low color reproducibility (above-mentioned particular six colors; among the 18 colors defined in JCS M 0001:2000, six colors of "D-010 Peony", "D-030 Red", "D-040 Red", "D-050 Orange", "D-060 Orange", and "D-070 Yellow").

FIG. 3 shows a graph obtained by plotting a* on the axis of abscissa and b* on the axis of ordinate, for the inks of the conditions 1330.

FIG. 4 shows a graph obtained by plotting the chroma saturation C* on the axis of abscissa and the lightness L* on the axis of ordinate, for the inks of the conditions 1330.

The color reproduction ranges of images formed with the selected inks were calculated and compared with the color tones of the 18 colors described in the following Table 1 (18 colors defined in JCS M 0001:2000), and thus the average color differences were determined.

The hue angle h, chroma saturation C*, lightness L*, a*, and b* were values in the CIE 1976 L*a*b* color space obtainable at the time of forming images with a halftone dot area ratio of 100% using each of the inks of various colors as a single color. Furthermore, the measurement conditions for L*a*b* included illuminant A and a viewing field of 2 degrees, and FD-7 manufactured by Konica Minolta, Inc. was used as the analyzer.

Meanwhile, the values of the hue angle h, chroma saturation C*, lightness L*, a*, and b* of the cyan ink, magenta ink, yellow ink, and black ink used for the simulation were as follows.

Cyan ink: hue angle h=179 degrees, chroma saturation C*=30, lightness L*=44, a*=−30, b*=1

Magenta ink: hue angle h=22 degrees, chroma saturation C*=21, lightness L*=48, a*=20, b* 8

Yellow ink: hue angle h=79 degrees, chroma saturation C*=58, lightness L*=50, a*=11, b*=57

Black ink: hue angle h=90 degrees, chroma saturation C*=6, lightness L*=28, a*=0, and b*=6

TABLE 1

|  |  | L* | a* | b* |
|---|---|---|---|---|
| D-010 | Peony | 47.6 | 40.7 | 12.0 |
| D-030 | Red | 41.4 | 45.1 | 18.7 |
| D-040 | Red | 42.4 | 44.0 | 21.4 |
| D-050 | Orange | 50.4 | 39.5 | 34.8 |
| D-060 | Orange | 55.0 | 36.3 | 44.9 |
| D-070 | Yellow | 60.6 | 16.0 | 53.4 |
| D-090 | Green | 44.1 | −18.9 | 20.5 |
| D-110 | Green | 41.3 | −24.7 | 11.6 |
| D-130 | Cyan | 42.8 | −19.9 | −12.7 |
| D-140 | Ultramarine | 33.7 | −6.6 | −19.4 |
| D-160 | Indigo | 33.7 | −11.0 | −15.6 |
| D-170 | Dark indigo | 32.1 | −3.3 | −9.6 |
| D-180 | Dark indigo | 31.3 | 0.7 | −16.0 |
| D-200 | Violet | 35.3 | 25.7 | 1.0 |
| D-220 | Brown | 40.3 | 16.1 | 21.0 |
| D-240 | Brown | 33.2 | 11.0 | 11.9 |
| D-250 | White | 77.1 | 3.9 | 7.2 |
| D-260 | Black | 23.5 | 1.2 | 2.3 |

Specifically, the 1330 inks having different conditions as shown in FIG. 3 and FIG. 4 were divided such that the values of the hue angle h, chroma saturation C*, and lightness L* were divided into three regions as described below, and the average color differences in Combinations No. 1 to No. 27 as shown in the following Table 2 were calculated. Regarding the average color difference, the average color differences for the 18 colors mentioned above, and especially the average color differences of the improving particular six colors were both calculated, and the minimum value in group of the average color differences was determined for each combination. The results are presented in the following Table 3.

—Divided Regions—

Hue angle h: −10 to 25, 25 to 65, 65 to 90

Lightness L*: 24 to 40, 40 to 56, 56 to 72

Chroma saturation C*: 24 to 36, 36 to 48, 48 to 60

TABLE 2

|  | Hue angle h | | Chroma saturation C* | | Lightness L* | |
|---|---|---|---|---|---|---|
|  | MIN | MAX | MIN | MAX | MIN | MAX |
| No01 | −10 | 25 | 24 | 40 | 24 | 36 |
| No02 | −10 | 25 | 24 | 40 | 36 | 48 |
| No03 | −10 | 25 | 24 | 40 | 48 | 60 |
| No04 | −10 | 25 | 40 | 56 | 24 | 36 |
| No05 | −10 | 25 | 40 | 56 | 36 | 48 |
| No06 | −10 | 25 | 40 | 56 | 48 | 60 |
| No07 | −10 | 25 | 56 | 72 | 24 | 36 |
| No08 | −10 | 25 | 56 | 72 | 36 | 48 |
| No09 | −10 | 25 | 56 | 72 | 48 | 60 |
| No10 | 25 | 65 | 24 | 40 | 24 | 36 |
| No11 | 25 | 65 | 24 | 40 | 36 | 48 |
| No12 | 25 | 65 | 24 | 40 | 48 | 60 |
| No13 | 25 | 65 | 40 | 56 | 24 | 36 |
| No14 | 25 | 65 | 40 | 56 | 36 | 48 |
| No15 | 25 | 65 | 40 | 56 | 48 | 60 |
| No16 | 25 | 65 | 56 | 72 | 24 | 36 |
| No17 | 25 | 65 | 56 | 72 | 36 | 48 |
| No18 | 25 | 65 | 56 | 72 | 48 | 60 |
| No19 | 65 | 90 | 24 | 40 | 24 | 36 |
| No20 | 65 | 90 | 24 | 40 | 36 | 48 |
| No21 | 65 | 90 | 24 | 40 | 48 | 60 |
| No22 | 65 | 90 | 40 | 56 | 24 | 36 |
| No23 | 65 | 90 | 40 | 56 | 36 | 48 |
| No24 | 65 | 90 | 40 | 56 | 48 | 60 |
| No25 | 65 | 90 | 56 | 72 | 24 | 36 |
| No26 | 65 | 90 | 56 | 72 | 36 | 48 |
| No27 | 65 | 90 | 56 | 72 | 48 | 60 |

TABLE 3

|  | Hue angle h | | Chroma saturation C* | | Lightness L* | | Minimum value in group of average color differences of 18 colors | Minimum value in group of average color differences of particular 6 colors |
|---|---|---|---|---|---|---|---|---|
|  | MIN | MAX | MIN | MAX | MIN | MAX |  |  |
| No01 | −10 | 25 | 24 | 40 | 24 | 36 | 6.3 | 10.6 |
| No02 | −10 | 25 | 24 | 40 | 36 | 48 | 5.6 | 9.0 |
| No03 | −10 | 25 | 24 | 40 | 48 | 60 | — | — |
| No04 | −10 | 25 | 40 | 56 | 24 | 36 | 6.0 | 9.8 |
| No05 | −10 | 25 | 40 | 56 | 36 | 48 | 4.6 | 5.9 |
| No06 | −10 | 25 | 40 | 56 | 48 | 60 | 4.6 | 6.0 |
| No07 | −10 | 25 | 56 | 72 | 24 | 36 | — | — |
| No08 | −10 | 25 | 56 | 72 | 36 | 48 | — | — |
| No09 | −10 | 25 | 56 | 72 | 48 | 60 | — | — |
| No10 | 25 | 65 | 24 | 40 | 24 | 36 | 7.0 | 12.9 |
| No11 | 25 | 65 | 24 | 40 | 36 | 48 | 5.4 | 8.3 |
| No12 | 25 | 65 | 24 | 40 | 48 | 60 | 5.3 | 7.9 |
| No13 | 25 | 65 | 40 | 56 | 24 | 36 | — | — |

TABLE 3-continued

|  | Hue angle h | | Chroma saturation C* | | Lightness L* | | Minimum value in group of average color differences of 18 colors | Minimum value in group of average color differences of particular 6 colors |
| --- | --- | --- | --- | --- | --- | --- | --- | --- |
|  | MIN | MAX | MIN | MAX | MIN | MAX | | |
| No14 | 25 | 65 | 40 | 56 | 36 | 48 | 4.9 | 6.7 |
| No15 | 25 | 65 | 40 | 56 | 48 | 60 | 4.1 | 4.5 |
| No16 | 25 | 65 | 56 | 72 | 24 | 36 | — | — |
| No17 | 25 | 65 | 56 | 72 | 36 | 48 | — | — |
| No18 | 25 | 65 | 56 | 72 | 48 | 60 | — | — |
| No19 | 65 | 90 | 24 | 40 | 24 | 36 | 8.1 | 16.2 |
| No20 | 65 | 90 | 24 | 40 | 36 | 48 | 7.9 | 15.5 |
| No21 | 65 | 90 | 24 | 40 | 48 | 60 | — | — |
| No22 | 65 | 90 | 40 | 56 | 24 | 36 | — | — |
| No23 | 65 | 90 | 40 | 56 | 36 | 48 | 6.6 | 12.3 |
| No24 | 65 | 90 | 40 | 56 | 48 | 60 | 4.8 | 6.7 |
| No25 | 65 | 90 | 56 | 72 | 24 | 36 | — | — |
| No26 | 65 | 90 | 56 | 72 | 36 | 48 | — | — |
| No27 | 65 | 90 | 56 | 72 | 48 | 60 | 4.7 | 6.4 |

*The symbol "—" in the table represents a region in which calculable data do not exist.

From Table 3, it was found that in both of the average color differences for the 18 colors and the average color differences in the particular six colors, the average color difference of the region of No. 15 had the minimum value.

From the results described above, the inks included in the region of No. 15 were arrayed in an increasing order of the color differences of images formed with the inks, and a comparison was made between the values of the hue angle h, chroma saturation C*, and lightness L* of 34 inks having smaller color differences. The results are presented in the following Table 4.

Furthermore, No. 14 was selected as a region having a relatively small color difference of formed images, in addition to No. 15. The inks included in the region of No. 14 were arrayed in an increasing order of the color differences, and a comparison was made between the values of the hue angle h, chroma saturation C*, and lightness L* of 30 inks having smaller color differences. The results are presented in the following Table 5.

TABLE 4

| Rank | Hue angle h | Chroma saturation C* | Lightness L* | Color difference |
| --- | --- | --- | --- | --- |
| 1 | 48 | 49.2 | 53.1 | 4.12 |
| 2 | 48 | 48.6 | 53.2 | 4.14 |
| 3 | 49 | 46.2 | 53.9 | 4.18 |
| 4 | 48 | 48.1 | 53.4 | 4.19 |
| 5 | 49 | 46.9 | 53.7 | 4.20 |
| 6 | 48 | 47.5 | 53.5 | 4.20 |
| 7 | 49 | 45.5 | 54.1 | 4.24 |
| 8 | 62 | 53.1 | 55.3 | 4.25 |
| 9 | 62 | 52.5 | 55.4 | 4.26 |
| 10 | 49 | 44.8 | 54.3 | 4.28 |
| 11 | 62 | 51.8 | 55.5 | 4.30 |
| 12 | 62 | 51.1 | 55.6 | 4.31 |
| 13 | 62 | 50.3 | 55.7 | 4.36 |
| 14 | 34 | 46.8 | 51.2 | 4.38 |
| 15 | 62 | 49.6 | 55.9 | 4.39 |
| 16 | 34 | 46.2 | 51.4 | 4.40 |
| 17 | 33 | 48.3 | 50.6 | 4.43 |
| 18 | 62 | 48.7 | 56.0 | 4.44 |
| 19 | 34 | 47.3 | 51.0 | 4.45 |
| 20 | 50 | 44.0 | 54.6 | 4.46 |
| 21 | 34 | 47.9 | 50.8 | 4.47 |
| 22 | 35 | 45.5 | 51.6 | 4.48 |
| 23 | 33 | 46.3 | 48.2 | 4.49 |
| 24 | 35 | 44.8 | 51.9 | 4.49 |
| 25 | 34 | 44.8 | 48.8 | 4.50 |
| 26 | 36 | 43.3 | 52.5 | 4.51 |
| 27 | 34 | 45.3 | 48.6 | 4.52 |
| 28 | 36 | 44.1 | 52.2 | 4.54 |
| 29 | 34 | 45.8 | 48.4 | 4.54 |
| 30 | 62 | 47.9 | 56.2 | 4.54 |
| 31 | 34 | 44.2 | 49.0 | 4.55 |
| 32 | 50 | 43.1 | 54.8 | 4.56 |
| 33 | 48 | 47.0 | 50.6 | 4.57 |
| 34 | 48 | 46.5 | 50.7 | 4.60 |

TABLE 5

| Rank | Hue angle h | Chroma saturation C* | Lightness L* | Color difference |
| --- | --- | --- | --- | --- |
| 1 | 33.4 | 44.3 | 46.0 | 4.91 |
| 2 | 33.5 | 43.8 | 46.1 | 4.99 |
| 3 | 33.7 | 43.3 | 46.3 | 5.01 |
| 4 | 34.0 | 42.8 | 46.5 | 5.05 |
| 5 | 34.3 | 42.3 | 46.7 | 5.11 |
| 6 | 34.6 | 41.7 | 46.9 | 5.20 |
| 7 | 35.1 | 41.0 | 47.1 | 5.33 |
| 8 | 35.6 | 40.4 | 47.4 | 5.43 |
| 9 | 33.3 | 42.4 | 43.8 | 5.43 |
| 10 | 33.5 | 41.9 | 44.0 | 5.52 |
| 11 | 33.7 | 41.5 | 44.1 | 5.57 |
| 12 | 34.0 | 41.0 | 44.3 | 5.63 |
| 13 | 34.3 | 40.5 | 44.5 | 5.71 |
| 14 | 48.0 | 43.0 | 46.0 | 5.72 |
| 15 | 48.1 | 42.5 | 46.1 | 5.81 |
| 16 | 33.3 | 40.5 | 41.8 | 5.88 |
| 17 | 48.2 | 42.1 | 46.2 | 5.88 |
| 18 | 48.3 | 41.5 | 46.4 | 5.94 |
| 19 | 33.5 | 40.1 | 41.9 | 5.97 |
| 20 | 48.4 | 41.0 | 46.5 | 6.04 |
| 21 | 48.6 | 40.4 | 46.7 | 6.11 |
| 22 | 61.7 | 46.2 | 47.9 | 6.14 |
| 23 | 47.9 | 41.1 | 43.8 | 6.17 |
| 24 | 61.7 | 45.7 | 48.0 | 6.21 |
| 25 | 48.0 | 40.7 | 43.9 | 6.26 |
| 26 | 48.1 | 40.2 | 44.1 | 6.35 |
| 27 | 61.6 | 44.1 | 45.6 | 6.47 |
| 28 | 61.6 | 43.6 | 45.7 | 6.54 |
| 29 | 61.6 | 43.1 | 45.8 | 6.62 |
| 30 | 61.6 | 42.5 | 45.9 | 6.69 |

From Table 4 and Table 5, it can be seen that among the various inks, an ink corresponding to the α ink according to the present invention is such that in a case in which the hue angle h is larger than that of the magenta ink and smaller than that of the yellow ink, the chroma saturation $C^*$ is higher than that of the magenta ink and lower than that of the yellow ink, and the lightness $L^*$ is higher than that of the magenta ink, the ink has a small color difference. That is, the color reproducibility of the 18 colors is high.

It can be seen that in a case in which the hue angle h of the α ink is 33 degrees to 62 degrees, the chroma saturation $C^*$ is 43 to 53, and the lightness $L^*$ is higher than 48 and 56 or lower, the color difference is smaller. That is, the color reproducibility of the 18 colors is higher.

Furthermore, it can be seen that in a case in which the hue angle h of the α ink is 47 degrees to 49 degrees, the chroma saturation $C^*$ is 48 to 50, and the lightness $L^*$ is 52 to 54, the color difference is particularly smaller. That is, the color reproducibility of the 18 colors is particularly high.

<Comparison of Color Reproducibility of Five Color Ink Set and Four Color Ink Set>

From the results described above, the ink of the first rank in No. 15 was selected as the α ink.

The cyan ink, magenta ink, yellow ink, and black ink described above, and the ink of the first rank in No. 15 as the α ink were used, and the average color differences for the 18 colors were determined by a method similar to the method described above. As a result, the average color difference for the 18 colors was 4.12.

Furthermore, the five color inks satisfied the relations of Formula 1 to Formula 3 described above.

Comparative Example 1

The four color inks of cyan ink, magenta ink, yellow ink, and black ink described above were used, and the average color difference for the 18 colors was determined by a method similar to the method described above. As a result, the average color difference for the 18 colors was 9.2.

From a comparison of the average color differences for the 18 colors of Example 1 and Comparative Example 1, it can be seen that the Example of the invention exhibits excellent color reproducibility.

Comparison of Color Reproducibility of Five Color Ink Set and Four Color Ink Set Example 2

An ink set including five color inks having the following values of the hue angle h, chroma saturation $C^*$, lightness $L^*$, $a^*$, and $b^*$, and a treatment liquid was used, and the color reproducibility of the 18 colors defined in JCS M 0001:2000 or the particular six colors was evaluated. The details of the five color inks, the treatment liquid, and the image forming method are as follows.

The five color inks were produced by mixing coloring materials, water, and water-soluble solvents. Regarding the coloring materials used for each color ink, the following were used.

Coloring material for cyan ink: PB15:4
Coloring material for magenta ink: PR122
Coloring material for yellow ink: PY74
Coloring material for black ink: PB7
Coloring material for α ink: PR150

—Five Color Inks—

Cyan ink: Hue angle h=188 degrees, chroma saturation $C^*$=17, lightness $L^*$=40, $a^*$=−17, $b^*$=−2

Magenta ink: Hue angle h=16 degrees, chroma saturation $C^*$=39, lightness $L^*$=42, $a^*$=37, $b^*$=10

Yellow ink: Hue angle h=84 degrees, chroma saturation $C^*$=51, lightness $L^*$=60, $a^*$=5, $b^*$=51

Black ink: Hue angle h=82 degrees, chroma saturation $C^*$=4, lightness $L^*$=29, $a^*$=−4

α ink: Hue angle h=33 degrees, chroma saturation $C^*$=45, lightness $L^*$=46, $a^*$=38, $b^*$=25

The hue angle h, chroma saturation $C^*$, lightness $L^*$, $a^*$, and $b^*$ of each ink are values in the CIE 1976 $L^*a^*b^*$ color space obtainable at the time of forming images having a halftone dot area ratio of 100% using each of the inks of various colors as a single color. The measurement conditions for $L^*a^*b^*$ included illuminant A and a viewing field of 2 degrees, and FD-7 manufactured by Konica Minolta, Inc. was used as an analyzer.

~Treatment Liquid~

As the treatment liquid, a preconditioner for JET PRESS (registered trademark), C-FJ-CP1 (containing malic acid, malonic acid, phosphoric acid, and 1,2,3-propanetricarboxylic acid as acidic compounds) manufactured by Fujifilm Corporation was used.

The viscosity of the treatment liquid was measured using a viscometer, TV-22 (manufactured by Toki Sangyo Co., Ltd.), and the viscosity was 2.9 mPa·s at 25° C.

The surface tension of the treatment liquid was measured using an automatic surface tensiometer, CBVP-Z (manufactured by Kyowa Interface Science Co., Ltd.), and the surface tension was 41 mN/m at 25° C.

The pH of the treatment liquid was measured using a pH meter, WM-50EG (manufactured by DKK-Toa Corporation), and the pH was pH 0.78 at 25° C.

~Image Forming Method~

An inkjet image forming apparatus as illustrated in FIG. 2 was prepared.

The image forming apparatus includes a flexographic coater 103 (amount of coating liquid: 1 ml/m2), a linear slider conveyance unit 102 (variable from 1 m/min to 50 m/min), a head for yellow ink (HY) 104 (SG1024 manufactured by Fujifilm Dimatix, Inc., liquid droplet volume: 30 picoliters, nozzle density: 400 npi (400 nozzles/inch), number of nozzles: 1024), a head for magenta ink (HM) 105 (SG1024 manufactured by Fujifilm Dimatix, Inc., liquid droplet volume: 30 picoliters, nozzle density: 400 npi (400 nozzles/inch), number of nozzles: 1024), a head for cyan ink (HC) 106 (SG1024 manufactured by Fujifilm Dimatix, Inc., liquid droplet volume: 30 picoliters, nozzle density: 400 npi (400 nozzles/inch), number of nozzles: 1024), a head for black ink (HK) 107 (SG1024 manufactured by Fujifilm Dimatix, Inc., liquid droplet volume: 30 picoliters, nozzle density: 400 npi (400 nozzles/inch), number of nozzles: 1024), and a head for α ink (HCL) 108 (SG1024 manufactured by Fujifilm Dimatix, Inc., liquid droplet volume: 30 picoliters, nozzle density: 400 npi (400 nozzles/inch), number of nozzles: 1024).

The distance between each head and the base material was set at 5 mm.

The following corrugated cardboard was used as the corrugated cardboard base material.

The corrugated cardboard is a double-sided corrugated cardboard that uses K liner (manufactured by Rengo Co., Ltd.) as the corrugated cardboard base paper and a general corrugating medium (manufactured by Rengo Co., Ltd.) as the corrugating medium, and in which the type of the corrugation is A flute.

The L*a*b* values of the surface of the corrugated cardboard were L*=62, a*=9, and b*=28. The L*a*b* values were measured using FD-7 manufactured by Konica Minolta, Inc.

(Treatment Liquid Applying Step)

The above-mentioned corrugated cardboard base material was fixed on a linear slider conveyance unit of a roll conveyance type inkjet image forming apparatus, and then while the linear slider conveyance unit having the corrugated cardboard base material fixed thereon was moved at a constant speed of 50 m/min in the conveyance direction, the treatment liquid was applied by a flexographic coater at a rate of 1 ml/m². Meanwhile, in a case in which the treatment liquid is applied at a rate of 1 ml/m², the application amount of the acidic compounds on the corrugated cardboard base material becomes 0.25 g/m².

(Ink Applying Step)

While the corrugated cardboard base material coated with the treatment liquid was moved by moving the linear slider conveyance unit at a constant speed of 50 m/min, the above-mentioned five color inks were jetted out onto the surface of the corrugated cardboard base material where the treatment liquid was applied, under the conditions in which the jetting amount per unit area of a single color ink from the heads (HY, HM, HC, HK, and Hα) would be 8680 pl/mm². Thus, an approximate image of 18 colors was formed.

[Evaluation]

—Color Differences in 18 Colors—

A comparison was made between the color tones of the approximate image of 18 colors produced as described above and the color tones of the 18 colors (18 colors defined in JCS M 0001:2000) or the color tones of the particular six colors described in Table 1, and the average color differences were determined. The evaluation results are presented in the following Table 6.

Comparative Example 2

An experiment was performed in the same manner as in Example 2, except that the α ink was not used, and the color reproducibility of the 18 colors defined in JCS M 0001:2000 or the particular six colors was evaluated using an ink set including four color inks of a cyan ink, a magenta ink, a yellow ink, and a black ink, and a treatment liquid. The evaluation results are presented in the following Table 6.

TABLE 6

|  |  | Average color difference of 18 colors | Average color difference of particular 6 colors |
|---|---|---|---|
| Example 2 | CMYKα | 9.02 | 8.38 |
| Comparative Example 2 | CMYK | 9.73 | 10.04 |

From Table 6, it can be seen that even in a case in which actual inks were used, excellent color reproducibility is obtained by using an ink set of five color inks of CMYKα, rather than by using an ink set of four color inks of CMYK.

EXPLANATION OF REFERENCES

12: treatment liquid applying unit
13: treatment liquid drying zone
14: ink jetting unit
15: ink drying zone
30K, 30C, 30M, 30Y, 30α: ink jetting head
101: corrugated cardboard base material
102: linear slider conveyance unit
103: Flexographic coater
104: head for yellow ink
105: head for magenta ink
106: head for cyan ink
107: head for black ink
108: head for α ink The disclosure of JP2015-198522 filed on Oct. 6, 2015 is incorporated herein in its entirety by reference.

All publications, patent applications, and technical standards mentioned in this specification are incorporated herein by reference to the same extent as if each individual publication, patent application, or technical standard was specifically individually indicated to be incorporated by reference.

What is claimed is:

1. An inkjet ink set for corrugated cardboard, the inkjet ink set comprising inks of five colors with different color tones, including a cyan ink, a magenta ink, a yellow ink, a black ink, and an α ink, a content of water being 50% by mass or more with respect to a total mass of the inks, and the inkjet ink set also comprising a treatment liquid containing an acidic compound, wherein, in a case in which images having a halftone dot area ratio of 100% are formed on a corrugated cardboard base material using each of the five color inks separately, the hue angle h, the chroma saturation C*, and the lightness L* of the formed images in the CIE 1976 L*a*b* color space satisfy the relations of the following Formula 1 to the following Formula 3:

$$h_M < h_\alpha < h_Y \quad \text{Formula 1}$$

$$C^*_M < C^*_\alpha < C^*_Y \quad \text{Formula 2}$$

$$L^*_M < L^*_\alpha \quad \text{Formula 3}$$

wherein, in Formula 1, $h_M$ represents the hue angle h of an image formed by the magenta ink; $h_\alpha$ represents the hue angle h of an image formed by the α ink; and by represents the hue angle h of an image formed by the yellow ink, wherein, in Formula 2, $C^*_M$ represents the chroma saturation C* of an image formed by the magenta ink; $C^*_\alpha$ represents the chroma saturation C* of an image formed by the α ink; and $C^*_Y$ represents the chroma saturation C* of an image formed by the yellow ink, and wherein, in Formula 3, $L^*_M$ represents the lightness L* of an image formed by the magenta ink; and $L^*_\alpha$ represents the lightness L* of an image formed by the α ink.

2. The inkjet ink set for corrugated cardboard according to claim 1, wherein the hue angles h of an image satisfy the following Formula 4, $h_M$ in Formula 4 is −45 degrees to 25 degrees, by in the Formula 4 is 51 degrees to 135 degrees, and $h_C$ in the Formula 4 is 160 degrees to 270 degrees:

$$h_M < h_\alpha < h_Y < h_C \quad \text{Formula 4}$$

wherein, in Formula 4, $h_M$ represents the hue angle h of an image formed by the magenta ink; $h_\alpha$ represents the hue angle h of an image formed by the α ink; by represents the hue angle h of an image formed by the yellow ink; and $h_C$ represents the hue angle h of an image formed by the cyan ink.

3. The inkjet ink set for corrugated cardboard according to claim 1, wherein the $h_\alpha$ is 33 degrees to 62 degrees.

4. The inkjet ink set for corrugated cardboard according to claim 1, wherein the $C^*_\alpha$ is 43 to 53.

5. The inkjet ink set for corrugated cardboard according to claim 1, wherein the $L^*_\alpha$ is more than 48 and 56 or less.

6. The inkjet ink set for corrugated cardboard according to claim 1, wherein the $h_\alpha$ is 47 degrees to 49 degrees.

7. The inkjet ink set for corrugated cardboard according to claim 1, wherein the $C^*_\alpha$ is 48 to 50.

8. The inkjet ink set for corrugated cardboard according to claim 1, wherein the $L^*_\alpha$ is 52 to 54.

9. An image forming method, comprising a step of applying inks on a corrugated cardboard base material by an inkjet method using the inkjet ink set for corrugated cardboard according to claim 1.

10. The image forming method according to claim 9, wherein an amount of jetting of ink per unit area by an inkjet method in the step of applying inks is 8680 $pl/mm^2$ or less.

11. The image forming method according to claim 9, wherein in the CIE 1976 $L^*a^*b^*$ color space of the surface of the corrugated cardboard base material where the inks are applied, $L^*$ is 52 to 72, $a^*$ is 4 to 14, and $b^*$ is 23 to 33.

* * * * *